(12) United States Patent
Stavros et al.

(10) Patent No.: US 12,086,057 B2
(45) Date of Patent: Sep. 10, 2024

(54) DISTRIBUTED IMMUTABLE DATA OBJECT TESTING

(71) Applicant: DIDO SOLUTIONS, INC., Poway, CA (US)

(72) Inventors: Robert Stavros, Poway, CA (US); Bryan Turek, Leesburg, VA (US); Ian Stavros, Portland, OR (US)

(73) Assignee: Dido Solutions, Inc., Poway, CA (US)

( * ) Notice: Subject to any disclaimer, the term of this patent is extended or adjusted under 35 U.S.C. 154(b) by 273 days.

(21) Appl. No.: 17/578,432

(22) Filed: Jan. 18, 2022

(65) Prior Publication Data

US 2022/0237111 A1     Jul. 28, 2022

Related U.S. Application Data

(60) Provisional application No. 63/282,042, filed on Nov. 22, 2021, provisional application No. 63/140,849, filed on Jan. 23, 2021.

(51) Int. Cl.
| | | |
|---|---|---|
| *G06F 9/44* | (2018.01) | |
| *G06F 11/30* | (2006.01) | |
| *G06F 11/36* | (2006.01) | |

(52) U.S. Cl.
CPC ...... *G06F 11/3692* (2013.01); *G06F 11/3006* (2013.01); *G06F 11/301* (2013.01); *G06F 11/3684* (2013.01); *G06F 11/3688* (2013.01)

(58) Field of Classification Search
None
See application file for complete search history.

(56) References Cited

U.S. PATENT DOCUMENTS

| | | |
|---|---|---|
| 2019/0251018 A1 | 8/2019 | Jin et al. |
| 2019/0377660 A1 | 12/2019 | Huang |
| 2019/0379538 A1 | 12/2019 | Oh et al. |
| 2020/0167512 A1 | 5/2020 | Chitra et al. |
| 2020/0295936 A1 | 9/2020 | Covaci et al. |
| 2020/0372168 A1 | 11/2020 | Stow |

(Continued)

FOREIGN PATENT DOCUMENTS

| | | |
|---|---|---|
| CN | 108681965 A | 10/2018 |
| KR | 102160379 B1 | 9/2020 |
| WO | 2021116728 A1 | 6/2021 |

OTHER PUBLICATIONS

CN108681965, Eng text, 2018 (Year: 2018).*

(Continued)

*Primary Examiner* — Insun Kang
(74) *Attorney, Agent, or Firm* — Anthony G. Smyth; LOZA & LOZA, LLP

(57) ABSTRACT

Systems, methods and apparatus for managing a distributed environment are disclosed. A method for testing nodes in a distributed system includes configuring a plurality of virtual nodes to emulate a distributed system that is used to process and manage distributed immutable data objects, initiating a test of the emulated distributed system, the test including performing one or more transactions on a first distributed immutable data object to obtain a modified first distributed immutable data object; and verifying the emulated distributed system by comparing the modified first distributed immutable data object with a second distributed immutable data object that has been processed in a validated system.

15 Claims, 18 Drawing Sheets

(56) References Cited

U.S. PATENT DOCUMENTS

2020/0387433 A1* 12/2020 Wang .................. G06F 16/2365
2021/0097537 A1    4/2021 Guo et al.

OTHER PUBLICATIONS

KR-102160379, Eng text (Year: 2020).*
CN-111373402-A, Eng text 2019 (Year: 2019).*
CN 109446096, Eng text, 2018 (Year: 2018).*
PCT/US22/12900. International Search Report (Apr. 27, 2022).

* cited by examiner

DISTRIBUTED IMMUTABLE DATA OBJECT TESTING

PRIORITY CLAIM

This application claims priority to and the benefit of U.S. Provisional Patent Application Ser. No. 63/140,849 filed in the U.S. Patent Office on Jan. 23, 2021, and of U.S. Provisional Patent Application Ser. No. 63/282,042 filed in the U.S. Patent Office on Nov. 22, 2021, the entire content of these applications being incorporated herein by reference as if fully set forth below in their entirety and for all applicable purposes.

TECHNICAL FIELD

This invention relates to system test environments, and more particularly to a test platform deployed across configured as a virtual network of virtual nodes that can be for training, testing, and simulation.

BACKGROUND

In 2009, a person or group of people using the name, Satoshi Nakamoto, wrote a paper which eventually was the driving force behind Bitcoin. Bitcoin was the first successful cryptocurrency based upon a decentralized, networked, distributed computing technology. At the heart of the technology is a distributed ledger that is updated using transactions held within blockchains and verified using proof of work.

Certain well-known technologies continue to make significant impacts on current day computing. For example, containers and virtual machines are well-known in the art and have made significant impacts on distributed computing. A container may be defined as a package or image that includes an application and its corresponding runtime libraries and dependencies. More recently, turnkey container products and management such as Docker® have become popular and have naturally led to the existence of successful container orchestration products such as Kubernetes®. A virtual machine may be defined as a software computer that emulates the operation of a physical computer. Containers and virtual machines can enable applications to be deployed and scaled according to design requirements and the capabilities of a physical processing environment.

SUMMARY

Certain aspects of the disclosure provide systems, apparatus and methods that can be used to test operations and elements of a distributed computing system securely and reliably. In some aspects, a test system may be implemented using some combination of physical processing devices, virtual machines and/or distributed containers to emulate a physical or real-world distributed computing system.

In one aspect of the disclosure, a method for testing nodes in a distributed system includes configuring a plurality of virtual nodes to emulate a distributed system that is used to process and manage distributed immutable data objects (DIDOs); initiating a test of the emulated distributed system, the test including performing one or more transactions on a first DIDO to obtain a modified first DIDO; and verifying the emulated distributed system by comparing the modified first DIDO with a second DIDO that has been generated from the first DIDO by a validated system.

In one aspect of the disclosure, a test platform for a distributed system includes a plurality of processing systems each configured to operate one or more of a plurality of virtual nodes; a network coupled to the plurality of processing systems and configured to communicatively couple the plurality of virtual nodes such that the plurality of virtual nodes is configured to emulate a distributed system that is used to process and manage DIDOs; and a test management processor. The test management processor may be configured to initiate a test of the emulated distributed system, the test including performing one or more transactions on a first DIDO to obtain a modified first DIDO; and verify the emulated distributed system by comparing the modified first DIDO with a second DIDO that has been generated from the first DIDO by a validated system.

In one aspect of the disclosure, a method for configuring a virtual environment includes configuring a virtual network of virtual nodes responsive to a request for testing, simulation or training in relation to a distributive system of interest deploying the distributive system among a plurality of virtual nodes in the virtual network, receiving results of the testing, simulation or training from the plurality of virtual nodes and providing a response to the request by combining the results of the testing, simulation or training received from the plurality of nodes.

In one aspect of the disclosure, a system includes a virtual network of virtual nodes and a virtual environment manager. The virtual environment manager may configure the virtual network of virtual nodes responsive to a request for testing, simulation or training in relation to a distributive system of interest, deploy the distributive system among a plurality of virtual nodes in the virtual network, receive results of the testing, simulation or training from the plurality of virtual nodes and provide a response to the request by combining the results of the testing, simulation or training received from the plurality of nodes.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The difficulties associated with system testing are substantially increased when the system to be tested is a distributed system. The components and platforms of distributed systems can be physically located anywhere in the world. Proper testing requires subject matter experts, distributed product experts, hardware experts, operating system experts, testing experts, etc. It also requires management experts to coordinate the people, resources and test scenarios within a specified period of time.

Cryptocurrency provides an example which relies on distributed computing. The rise in expectations for distributed computing brought about by the success of cryptocurrencies such as Bitcoin® has resulted in a great enthusiasm and exuberance on the part of corporations and investors to participate in the opportunities and benefits of distributed computing systems in general and cryptocurrencies specifically. Distributed computing products, especially cryptocurrencies are, by nature, developed as part of a community-of-interest (COI). If not governed correctly, COI can compound the risks to success of the distributed system.

A cryptocurrency is a term applied to a form of asset used in an exchange mechanism that relies on a digital medium for operation. In some examples, coin ownership records are recorded and maintained in a distributed ledger. The distributed ledger may be implemented using a distributed ledger technology and a computerized database. Strong cryptography technologies are employed to secure transaction records maintained by the distributed ledger. In some examples, the distributed ledger may be constructed using blockchains in which ledger entries, records or transactions are maintained as blocks, and where each block includes a cryptographic hash of the previous block and a timestamp.

Figure 1:
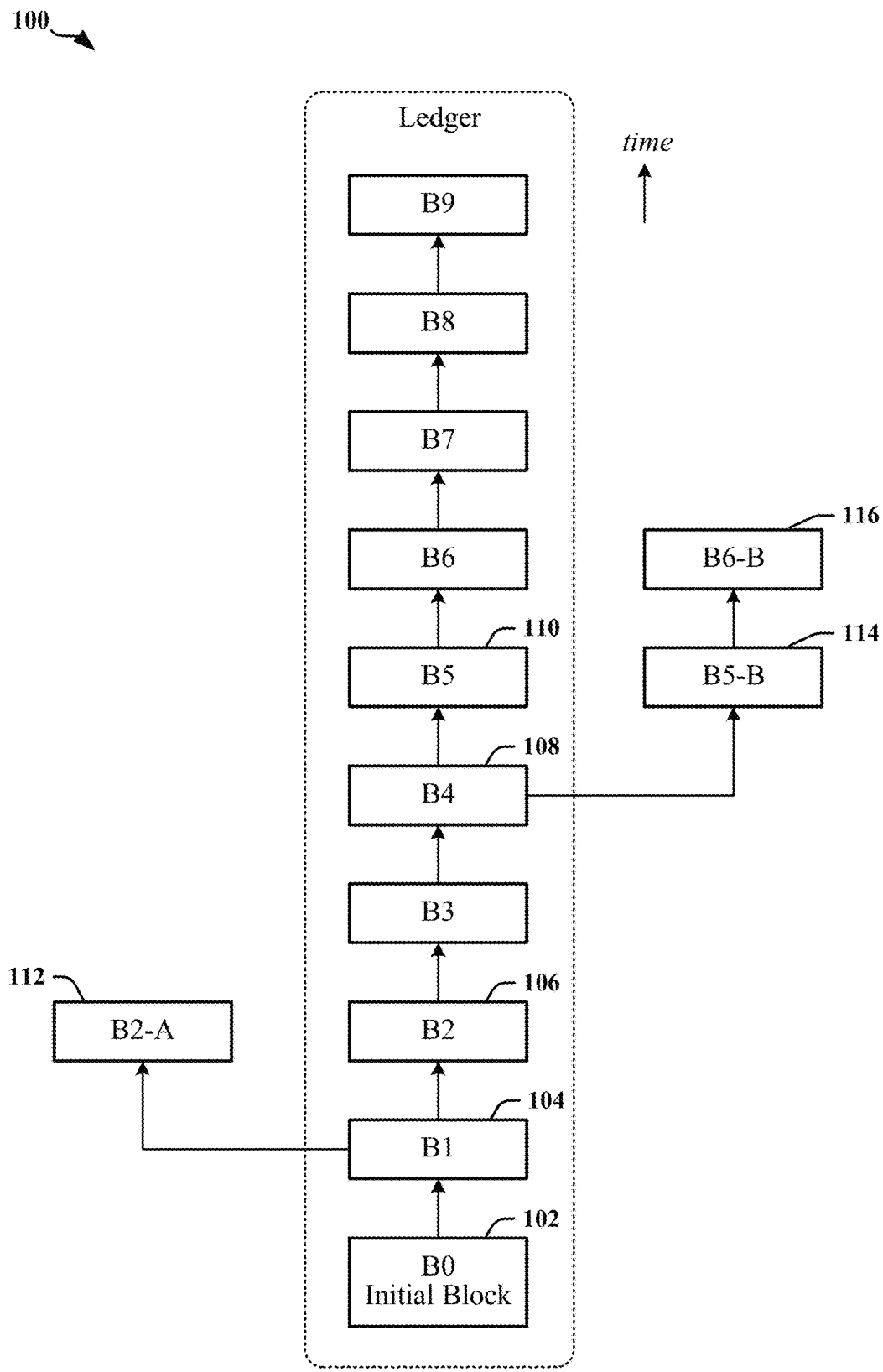
FIG. 1 illustrates certain aspects of an example of development of a blockchain-based distributed ledger.

FIG. 1 illustrates certain aspects of an example of development of a blockchain-based distributed ledger 100. The distributed ledger 100 is initiated with a first block 102 from which subsequent blocks are created including blocks 104, 106, 108, 110, 112, 114, 116. Each block holds one or more valid transactions, which are hashed and encoded into a tree structure. Each block includes the cryptographic hash of the prior block in the blockchain, linking each subsequent block to its immediate predecessor. In one example, block 104 includes the cryptographic hash of block 102 and block 106 includes the cryptographic hash of block 104. The blocks 102, 104 and 106 form a chain. In some instances, an offshoot or orphan subsequent blocks 112 or 114 are created in parallel or addition to corresponding subsequent blocks 106 or 110 created from a predecessor block 104 or 108 that are included in the main chain.

A blockchain can be controlled and managed by a peer-to-peer network operating in accordance with inter-node communication protocols and validation protocols used to create new blocks 104, 106, 108, 110, 112, 114, 116. While control over cryptocurrencies is exercised in a decentralized manner, the underlying technology is considered secure by design. When a transaction is recorded in a block, the block cannot be modified without modifying all subsequently generated blocks.

Certain aspects of this disclosure employ community-based testing that can be securely and reliably used for testing distributed computing systems. In some examples, the presently disclosed community-based testing can be used to test, validate, qualify or certify distributed computing systems that manipulate or manage distributed ledgers such as the blockchain-based distributed ledger 100 illustrated FIG. 1. The adoption of distributed computing presents some new and unique technical hurdles for existing corporations to overcome, and also requires corporations to adapt in order to participate in products running on networks and computers outside of their control. The use of products based on distributed computing may require that corporations participate as a peer within a community to accomplish a common goal while the participating corporations are able to retain confidence in the quality of the tested product.

The use of conventional community based testing for cryptocurrencies cannot be easily performed in a repetitive manner. Blockchain usage necessitates that any test that involves modifying the ledger irrevocably changes the blockchain. Any repeated test is consequently performed on the modified blockchain. Furthermore, errors or problems introduced by faulty systems during testing cannot be removed or backed-out from the blockchain and erroneous or problematic data remains in the blockchain.

Certain aspects of this disclosure provide a virtualized environment that can be established on an existing physical infrastructure to test cryptocurrencies and other blockchain-based systems without leaving a permanent footprint in a blockchain. The virtualized environment can be initialized multiple times such that a test can repetitively commence from a desired starting point with a preconfigured context and blockchain. The results of the test can be assessed and the test can be rerun with an identical virtual system configuration or with a modified or updated system configuration. The virtual system may be configured to emulate or simulate a physical system or aspects of a physical system. For the purposes of this disclosure, a virtual system emulates a physical, real-world system when it imitates and closely matches the behavior of the real-world system. For the purposes of this disclosure, a virtual system simulates a physical, real-world system when it imitates the real-world system without matching one or more behaviors of the real-world system. For example, an emulation may operate according to a timeline that runs at real world speed, whereas a simulation may operate according to an accelerated or decelerated timeline.

In some examples, a virtual system time may be defined that is not anchored or locked to real time. For example, the starting point of a timeline may be configured when initiating the virtual system on a virtual network. Accordingly, identical subsequent blocks in a blockchain can be created in different executions of the virtualized system at the same virtual time to confirm that transactions are recorded in a consistent manner. In one example, the use of a virtual system time enables certain time-sensitive cryptographic hash algorithms to produce predictable or repeatable results during multiple test cycles. For simulations, virtual system time may be unconnected with real time and may run at a different rate than real time permitting virtual time to be expanded or compressed.

Certain aspects of this disclosure can provide a simplified testing environment that keeps the potential risks of adoption of a new, reconfigured or otherwise untested system within acceptable levels in accordance with tolerances set by corporate objectives. A testing environment is provided that can simplify testing procedures and significantly shorten the process of starting up a distributed system for testing through the use of a distributed immutable data objects (DIDO) or multiple DIDOs. A testing environment disclosed herein may be referred to herein as the "Distributed Immutable Data Object Testing Environment" (DIDO TE). The term "DIDO" may also be used to refer to the underlying technologies that support distributed data and computation across a distributed network of peers using consensus algorithms to maintain integrity and consistency across the network. A DIDO is immutable to the extent that certain data objects included in or managed by the DIDO can never be changed. Newer copies of the data can be created and can coexist with the originals, but each new copy of a DIDO points back to the previous version of, or within the DIDO. Different versions of DIDO may be created when a real-world DIDO is created for use as a baseline DIDO in the DIDO TE. Versions of the baseline DIDO may be created when an identical copy of the baseline DIDO is manipulated in the DIDO TE in accordance with a test plan. Different versions of the baseline DIDO may be compared when evaluating test results. The initial content of a version of the baseline DIDO may be compared with content of the same version of the baseline DIDO after execution of some or all of the test plan.

After a DIDO has been configured or instantiated, a user can use the DIDO TE to rigorously test a system. The DIDO TE may be implemented as a virtualized, containerized testbed to enable a variety of types of test to be performed. The DIDO TE may comprise multiple virtual nodes, each virtual node configured to perform one or more types of testing, including comparative testing and evaluation between distributed system implementations. A DIDO TE may be used for testing, simulation or training purposes. In some examples, the DIDO TE may be used to validate or certify the operation of system components using a defined timeline, one or more preconfigured immutable objects, and a sequence of actions or transactions involving the preconfigured immutable objects. In the latter example, a known, repeatable context may be created and recreated in which deterministic results can be expected from systems, nodes, platforms and functional elements that perform in accordance with corresponding specifications.

In some examples, a DIDO TE may be configured to test a new or updated platform. It is generally desirable to test a new platform under real-world operating conditions without impacting or compromising an operational system. A DIDO TE may be configured with a variety of virtual nodes that emulate constituent elements of the real-world operational system. An artificial timeline may be defined for the DIDO TE. The DIDO TE may be configured with copies of real-world status information, data and one or more DIDOs captured from the real-world operational system. The DIDO TE may then begin operation at a selected point-in-time configured by a DIDO TE manager. The DIDO TE may be initially configured with validated virtual nodes and used to generate one or more baselines for a test plan. A baseline may define expected results from a test that follows a corresponding test plan executed on a specified or identified DIDO TE. The DIDO TE may then be used to exercise a new or modified virtual node introduced to the DIDO TE that emulates a new or updated physical node using the test plan. The test plan may be executed using the DIDO TE that includes the new or modified virtual node and results compared to a baseline. Results may include status information, data and one or more DIDOs captured from the DIDO TE after execution of the test plan. Results may include information gathered from the modified virtual node and/or from one or more validated virtual nodes. The results may, for example, include an analysis of differences between versions of a DIDO generated using the test plan and versions of the DIDO provided by the baselines. The test plan may include repetitions, variations in timing and introductions of events or stressors intended to test the capability, reliability and functionality of a system of virtual nodes or one or more individual nodes.

In some examples, a DIDO TE may be configured to perform simulations of physical networks of validated nodes. In some examples, a DIDO TE may be configured to perform simulations in which certain physical networks or nodes are emulated by systems, network or nodes under test. Simulations may be performed to evaluate or predict performance and reliability of a physical system under changing conditions or under conditions that seldom occur in normal operations. Simulation can be used to evaluate overall system performance or performance of individual nodes, groups of nodes, types on nodes or versions of the same type of node. For instance, simulation may explore the effects of loss of processing power in a node that comprises a cellular telephone device when processor throttling is used to reduce battery depletion rates and mitigate temperature increases. A DIDO TE may be configured with a variety of virtual nodes that emulate constituent elements of the real-world operational system. An artificial timeline may be defined for the DIDO TE. In some simulations, the artificial timeline may be followed at the same rate (full-rate) as a real-world system. In some simulations, the artificial timeline may be accelerated with respect to the real-world system in order to simulate long periods of real-world operation in more a manageable testing period. In some simulations, the artificial timeline may be decelerated with respect to the real-world system. Deceleration may provide improved visibility into complex, rapidly occurring transactions. The DIDO TE may be configured with copies of real-world status information, data and one or more DIDOs captured from the real-world operational system. The DIDO TE may then begin operation at a selected point-in-time configured by a DIDO TE manager. The DIDO TE may be initially configured with validated virtual nodes and used to generate one or more baselines for a script or test plan. The DIDO TE may then be used to exercise a new or modified virtual node introduced to the DIDO TE that emulates a new or updated physical node using the script or test plan.

In some examples, a DIDO TE may be configured for training purposes. For training purposes, the DIDO TE may be configured for test or simulation mode based on the nature of the training to be performed. In some instances, end-users or system operators may be trained using a script-driven DIDO TE that provides a preconfigured flow configured to familiarize and instruct a trainee on proper operation of the system, issue identification and resolution and error handling. In some instances, system engineers and developers may be trained using a test plan executed on a DIDO TE that that familiarizes and instructs a trainee on system functions, development tools and troubleshooting.

Figure 2:
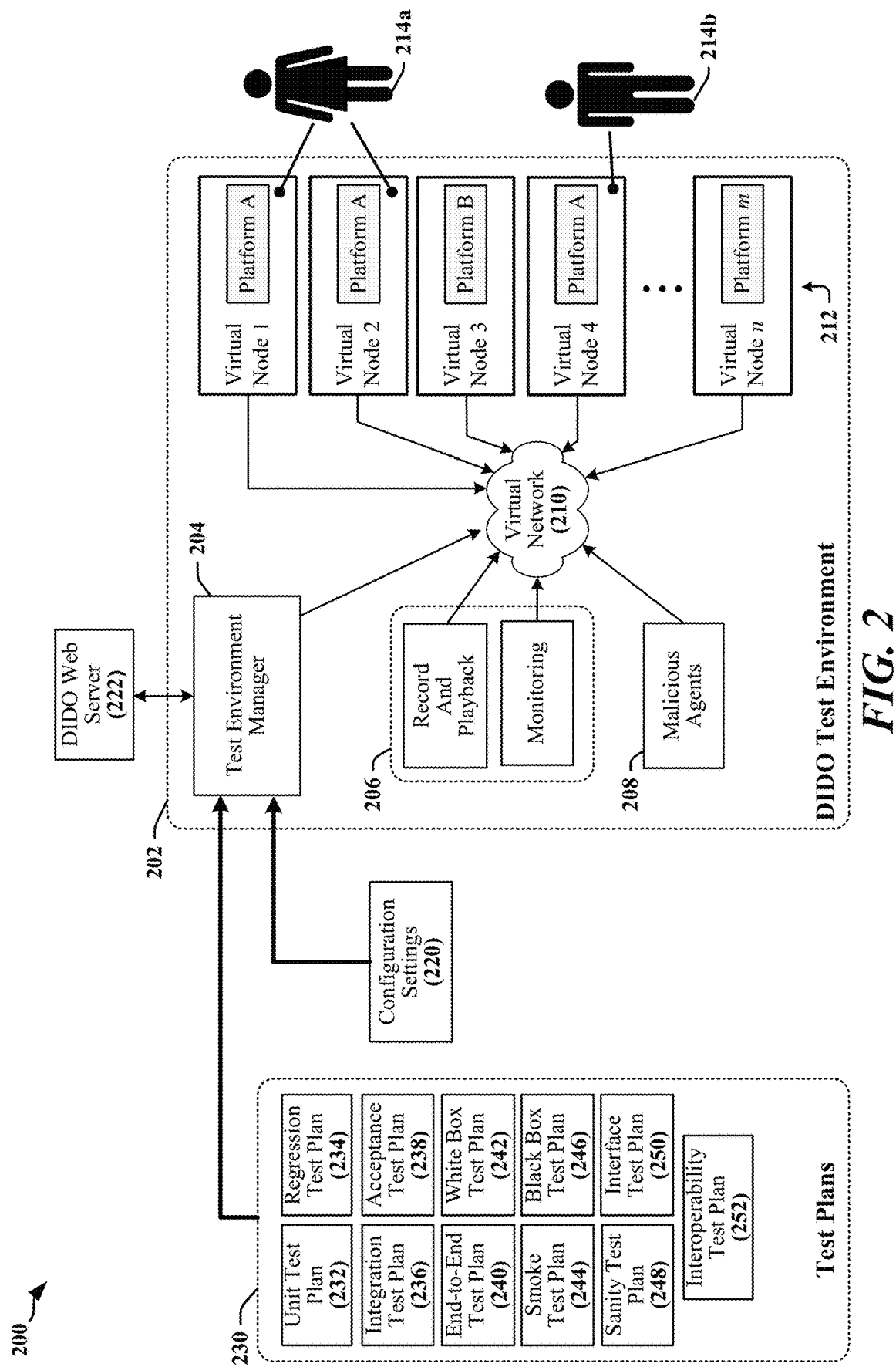
FIG. 2 illustrates a first example of a distributed test environment (TE) configured in accordance with certain aspects of the disclosure.

FIG. 2 shows an example of a DIDO Testing Framework 200 that includes or incorporates a test environment or (the DIDO TE 202). The DIDO Testing Framework 200 can operate within any environment configured with a specialized aggregation of DIDO Solution specific concepts and interfaces that can ease control and management of a distributed network of nodes in a DIDO TE. The DIDO Testing Framework 200 can orchestrate on-demand workflows through a series of distributed workflow processes. In one example, the DIDO Testing Framework 200 may provide, implement or use a mailbox messaging paradigm to communicate status or control requests.

Throughout the stages of a defined workflow, processes are spawned, messages are acted upon, responses are received, and resources are freed after the work is completed. The processes may be distributed in the manner of a distributed application, and in some implementations, the DIDO Testing Framework 200 can host an instance of itself, permitting the system to grow ad infinitum.

In certain examples, the DIDO TE 202 can be built upon a functional programming language such as the Elixir functional programming language that may be configured for use with a virtual machine such as the BEAM virtual machine that is core component of the Erlang Open Telecom Platform (OTP), and which may be referred to herein as an Erlang virtual machine. Other virtual machines and associated programming languages may be employed in other examples. The illustrated DIDO TE 202 has four main applications that govern a messaging layer through custom Application Programming Interfaces (APIs). In some examples, interaction with these APIs can be effected through a public representational state transfer (REST) interface or via a simple and easy to use graphical user interface (GUI). The term "REST interface" may refer to a distributed system framework that uses Web protocols and technologies. A REST architecture may relate to client and server interactions. Applications may be packaged and made distributable for any host operating system, thereby allowing for portability and the use of isolated operating environments.

In the illustrated example, the DIDO TE 202 may include a test environment manager 204. The test environment manager 204 may include one or more communicatively coupled processing systems that operate to configure one or more virtual nodes 212. In some instances, a virtual node 212 may be physically collocated with the test environment manager 204 or a processing system that is a component of the test environment manager 204. In some instances, a virtual node 212 may be located in a location that is remote and may communicate with the test environment manager 204 through a local area network or a wide area network such as the Internet. The DIDO TE 202 may include or configure a virtual network 210 that permits the test environment manager 204 to communicate with virtual nodes 212 without regard to physical distance separating the test environment manager 204 from the virtual nodes 212. In some examples, the virtual network 210 may be configured to represent distances, latencies and communication protocols used for communication between nodes and management systems in physical, real world distributed systems.

In some implementations, a secure HTTP(S) web server (DIDO Web Server 222) may be used to host a user-friendly web GUI to interact and configure the DIDO TE 202. In some implementations, the DIDO Web Server 222 application may be co-hosted with the REST interface for client and third-party application access. These two services can be tightly coupled for use-case flexibility and feature implementation ease. Third-party authentication provides the application with multiple integration possibilities for additional future plugin features.

According to one aspect of the disclosure, the virtual network 210, one or more virtual nodes 212 and/or an emulated or simulated system may be tested using a sequence of transactions and/or events that are defined in the set of test plans 230. Testing may be performed using multiple active test plans in a set of test plans 230. In some instances, testing may include simulated events caused by or associated with malicious agents 208 that may be simulated by the DIDO TE 202.

In one example, one or more virtual nodes may be configured to perform acceptance testing according to an acceptance test plan 238. Acceptance testing is a technique that can be performed to determine whether or not a software system has met the requirement specifications. The requirement specifications may describe functional and non-functional features required of the software system.

In some examples, one or more virtual nodes may be configured to perform black box testing according to a black box test plan 246, which may be defined as a type of software testing in which the functionality of the software is unknown. The testing can be performed without internal knowledge of the products. In some instances, black box testing can include syntax driven testing and equivalence partitioning. Syntax driven testing may be applied to systems that can be syntactically represented by some language such as compilers or language that can be represented by context-free grammar. In the latter instances, test can be generated so that each grammar rule is used at least once. Equivalence partitioning may involve partitioning an input domain of the system into a number of equivalence classes such that each member of class works in a similar way. Many types of inputs operate in a similar manner and similar inputs can be grouped and testing can be performed on only one input of each group. For example, each member of an equivalence classes operates similarly and if a test case performed on one member of a class results in some error, other members of class can be expected to respond to the test with the same error.

In some examples, one or more virtual nodes may be configured to perform end-to-end testing (E2E testing) according to an end-to-end test plan 240. E2E testing may refer to a software testing method that involves testing an application workflow from beginning to end. This method aims to replicate real life scenarios to validate the system for integration and data integrity. The virtual node performs E2E testing by executing every operation configured for the application to determine how the application communicates with hardware, network connectivity, external dependencies, databases, and other applications. Typically, E2E testing is executed after functional and system testing is complete.

In some examples, one or more virtual nodes may be configured to perform integration testing according to an integration test plan 236. Integration testing may be performed to test individual components to determine how they function together. Integration testing may be performed to test modules that have been determined to function properly as individual or standalone elements and that have no apparent bugs when integrated. Integration testing is the most common functional testing type and can be performed using automated testing. Typically, different developers concurrently build different modules of a system or software simultaneously without reference to other modules. These developers may perform extensive unit tests on the individual modules, including black box and white box functional verifications. Integration testing is performed by causing data and operational commands to flow between modules, which are operated as parts of a whole system rather than individual components. Integration testing can uncover issues with user interface operations, data formats, operation timing, application programming interface (API) calls, and database access and user interface operation.

In some examples, one or more virtual nodes may be configured to perform interoperability testing according to an interoperability test plan 252. Interoperability testing may be performed to test the ability of individual components to function within a group of components. Interoperability may be configured to test responses to variabilities in the performance of virtual nodes or functional components. For example, a collocated node or functional component accessed through a fast communication link may respond with lower latency (i.e., quicker) than a remotely located node accessed over a slower communication link. Interoperability testing may be performed to ensure that virtual devices under test can properly respond to transactions and events notwithstanding timing skews. Interoperability testing can be performed by causing data and operational commands to flow between modules, which are operated as parts of a whole system rather than individual components. Interoperability testing may address the timing variations and other variations related to a set of issues addressed by integration testing.

In some examples, one or more virtual nodes may be configured to perform interface testing between nodes according to an interface test plan 250. An interface may comprise a connection that integrates two components and may include an API, web services, and other types of connecting services. An interface may include software that comprises sets of commands, messages, and other attributes that enable communication between a device and a user. Interface testing may be performed as a software testing type that verifies whether the communication between two different software systems is performed correctly.

In some examples, one or more virtual nodes may be configured to perform regression testing according to a regression test plan 234. Regression testing may include repetitively running tests for functional requirements and non-functional requirements to ensure that a previously developed and tested network of virtual nodes performs as expected after a change to one or more nodes. A failure or error may be called a regression with regards to the functionality. Changes that require regression testing include bug fixes, software enhancements, configuration changes, and substitution of electronic or other hardware components. As regression test suites tend to grow with each defect found, test automation is frequently involved. Sometimes a change impact analysis is performed to determine an appropriate subset of tests (non-regression analysis).

In some examples, one or more virtual nodes may be configured to perform sanity testing according to a sanity test plan 248. Sanity testing may be a subset of regression testing. Sanity testing is performed to ensure that the code changes that are made are working as expected. Sanity testing is a stoppage to check whether testing for a software build can proceed or not. One purpose of sanity testing is to validate the functionality of the application without performing detailed testing. Sanity testing is generally performed on a build where the production deployment is required immediately, such as after a critical bug fix has been made.

In some examples, one or more virtual nodes may be configured to perform smoke testing according to a smoke test plan 244. Smoke testing may be performed on a new or updated software build to verify if the basic functionalities are working. Smoke testing is typically the first test to be done on any new build. In smoke testing, the test cases are chosen to cover the most important functionality or component of the system. The objective is not to perform exhaustive testing, but to verify that the critical functionality of the system is working as expected.

In some examples, one or more virtual nodes may be configured to perform unit testing according to a unit test plan 232. Unit testing is performed to ensure that each part of the code in a component delivers a desired or expected output. Unit testing is typically directed to the interface and the specification for a component. Unit testing can provide documentation of code development as each unit of the code is thoroughly tested standalone before progressing to another unit. Unit tests support functional tests by exercising the code that is most likely to break.

In some examples, one or more virtual nodes may be configured to perform white box testing according to a white box test plan 242. White box testing employs techniques that analyze the internal structures, including data structures, internal design, code structure and the functioning of the software beyond black box testing. White box testing may also be referred to as glass box testing, clear box testing or structural testing.

The DIDO TE may be based on a reference architecture, referred to herein as the DIDO-Reference Architecture (DIDO-RA). The DIDO TE provides a unique dynamic distributed testing environment as a service (TEaaS) that can be made widely accessible and available. The DIDO TE covers a broad range of user scenarios for platforms that include or employ DIDOs. The DIDO TE can rapidly deploy a network of virtual nodes for use-cases that include peer-to-peer, blockchains with smart-contracts, and clustered applications.

In some examples, the core of the functioning product includes the following DIDO TE functions are.

A function that can create multiple kinds of nodes in a virtualized network with all the required resources allocated for interoperability testing.

A function that can rapidly scale from one to thousands of virtualized nodes on a virtualized network ready for testing.

In some examples, the test environment manager 204 is the core engine and controller of the DIDO TE framework 200. The test environment manager 204 manages and controls the entire lifecycle of DIDO virtual networks, applications, test case executions, and resource management. A DIDO Test Manager API may include a custom integral node command map to ensure expandability and unique protocol support for any distributed application. Custom resource orchestration and management protocols allow the configuration of virtual nodes for different operating systems and other environment choices and support parameters. In some examples, a virtual node can be a virtual machine or container.

Figure 3:
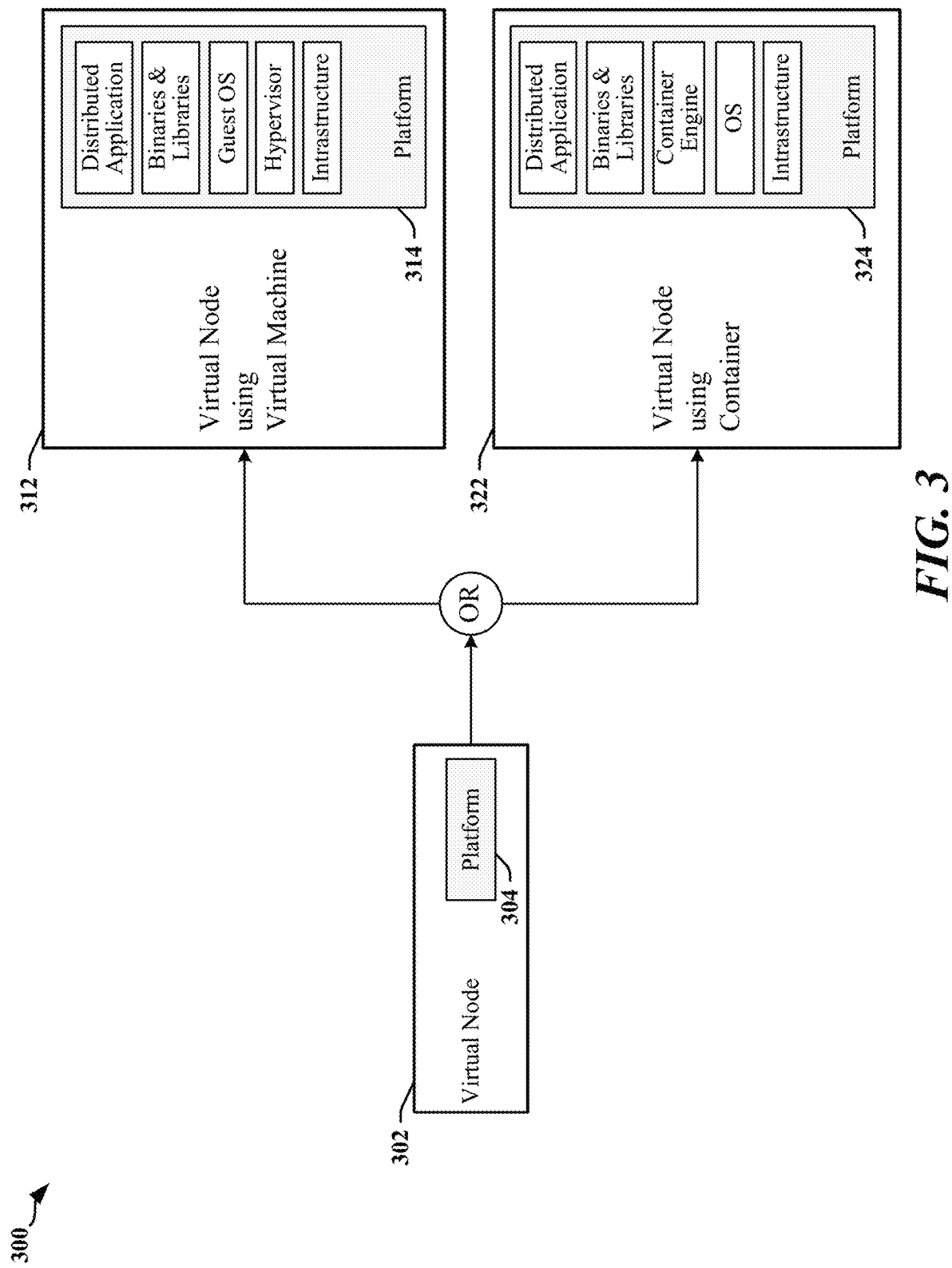
FIG. 3 illustrates virtual nodes that may be configured in accordance with certain aspects of the disclosure.

FIG. 3 illustrates examples of a virtual node 302 that provides a platform 304 that can be used to implement portions of the DIDO Testing Framework 200 illustrated in FIG. 2. The virtual node 302 may be implemented using different virtual node types 312, 322 that can be configured in accordance with certain aspects of the disclosure. A first virtual node type 312 may be implemented using a virtual machine such as an Erlang virtual machine. The platform 314 provided by the first virtual node type 312 may be configured with components that are compatible with the selected virtual machine. A second virtual node type 322 may be implemented using a container. A container can wrap a DIDO application using a custom framework to interact with a container orchestration platform such as Kubernetes®. In one example, a node of an open-source, distributed ledger cryptocurrency network, such as an IOTA network) may be implemented on a virtual node by providing context and other information to the virtual node before initiating the IOTA virtual node instantiation. The platform 324 provided by the second virtual node type 322 may be configured to support container operations.

Figure 4:
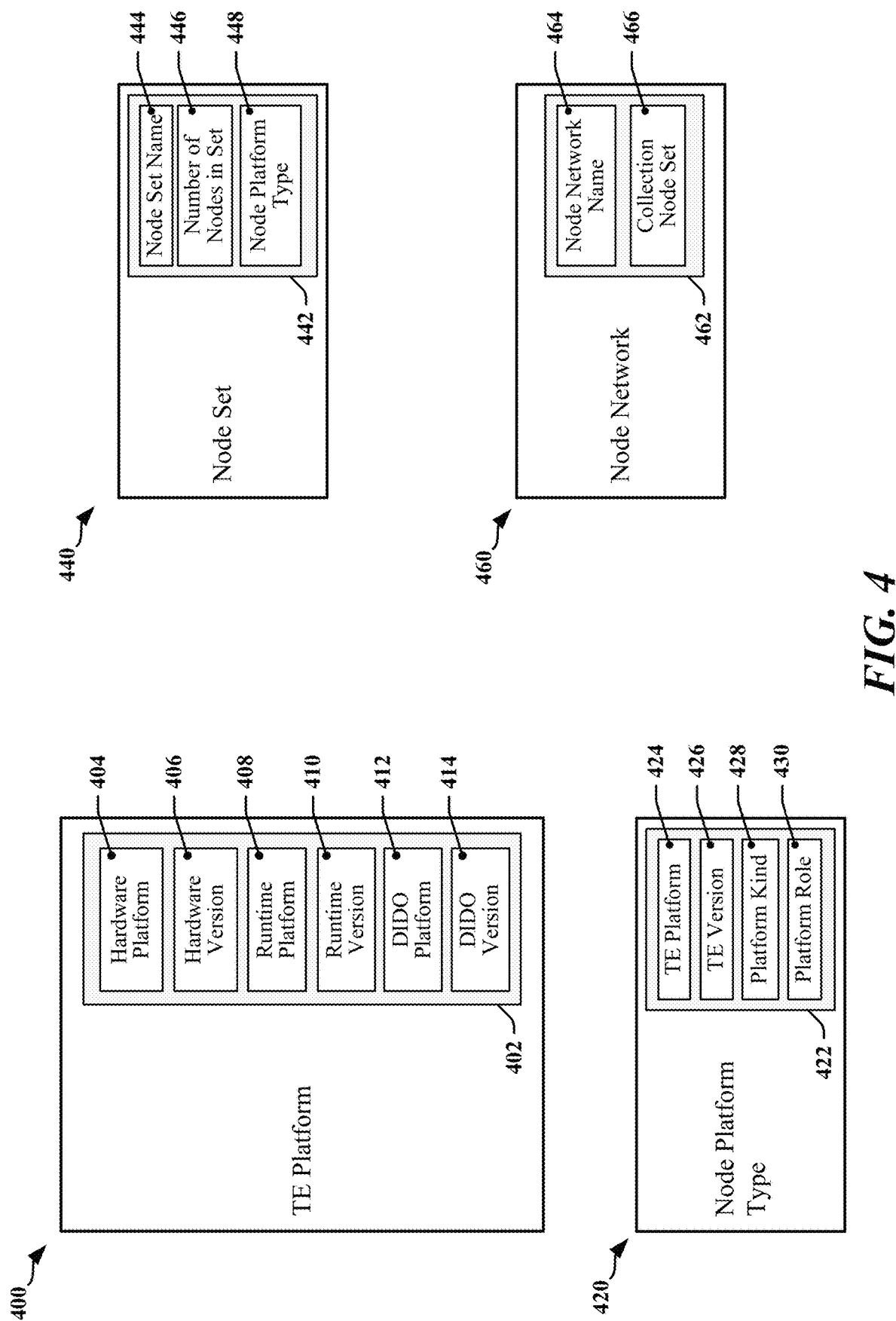
FIG. 4 illustrates configurable features of a distributed immutable data object (DIDO) TE provided in accordance with certain aspects of this disclosure.

FIG. 4 illustrates certain configurable features of a DIDO TE system provided in accordance with certain aspects of this disclosure. A DIDO TE platform 400 includes examples of components that can be implemented using some combination of hardware and software modules. The DIDO TE platform 400 may employ one or more processing circuits that include processors configurable to execute a desired runtime system in a manner that emulates a target DIDO production environment. In some instances, a processing circuit may include the type of processor used in the target DIDO production environment. In some instances, a processing circuit may be operated under the control of a virtual machine that can emulate the type of processor used in the target DIDO production environment.

Figure 5:
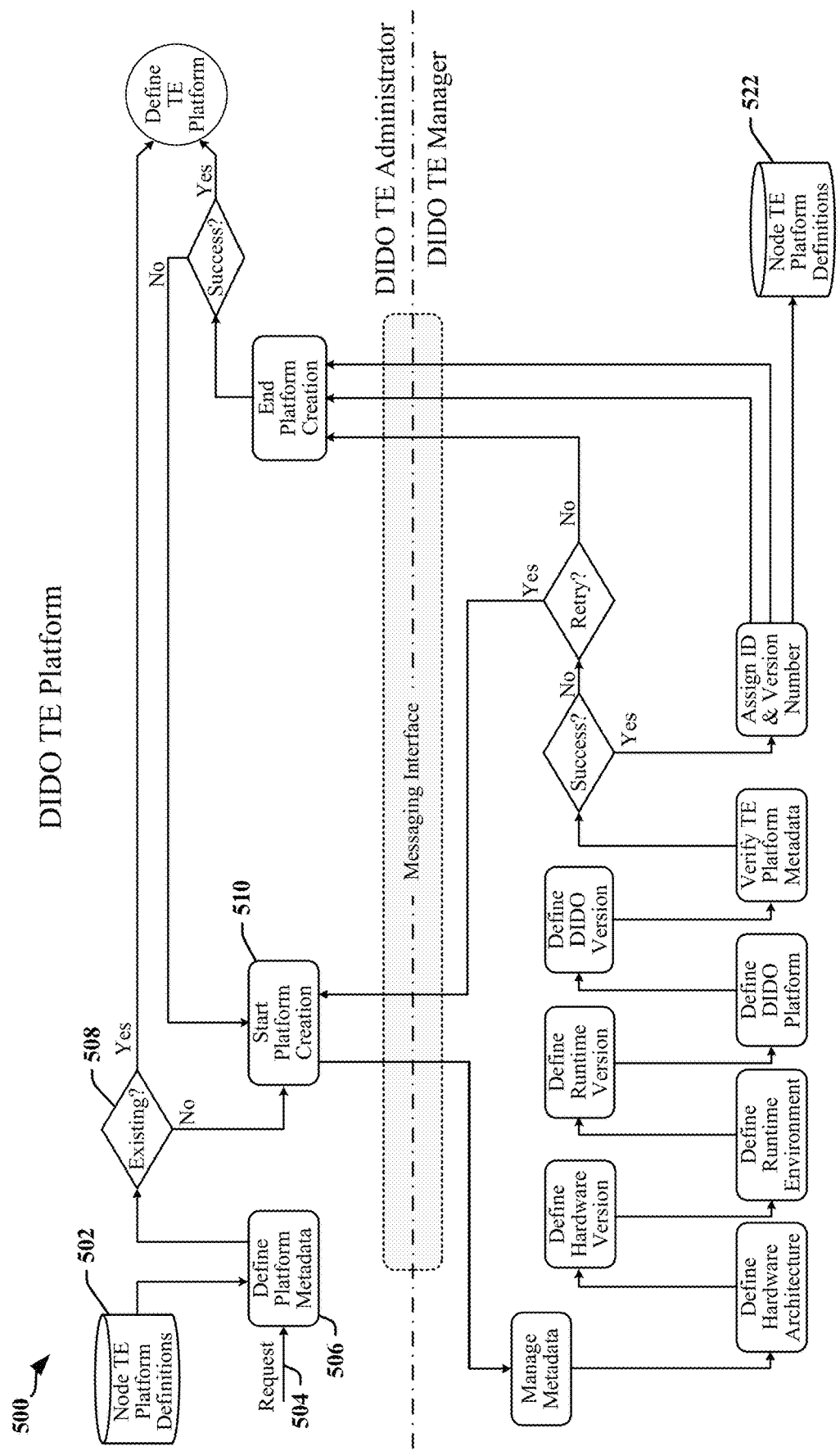
FIG. 5 is a flow diagram that illustrates a process for defining a DIDO TE platform in accordance with certain aspects of the disclosure.

The DIDO TE Platform 400 may be defined by a TE manager as further illustrated in FIG. 5 for example. A DIDO TE Platform 400 includes a combination of components 402 that can be implemented using some combination of hardware and software modules. The TE manager may define a type of the hardware platform 404 to be used, including the version 406 or vintage of the hardware employed by the hardware platform 404. In one example, the hardware platform 404 may be characterized by processor type and associated resources and peripherals. In another example, the hardware platform 404 may be characterized by a device type such as a cellular telephone that has a set of capabilities provided by a wireless modem, user interface and/or a system-on-chip that has a processor and associated resources and peripherals. The TE manager may define a runtime environment including a runtime platform 408 that may have a specified runtime version 410. The runtime platform 408 may represent the operating system, device drivers, interrupts scheme and other modules that control or interact with elements of the hardware platform 404. The runtime platform 408 may include a standards-defined, commercial or proprietary operating system. In some examples, the operating system may be a version of Unix, Linux, Windows, Java VM, etc. or their derivatives. The TE manager may define one or more libraries, including runtime libraries for the defined operating system or for a programming language (e.g. Solidity).

The TE manager may define a DIDO Platform 412 and, in some instances, a version 414 of the DIDO Platform 412. The DIDO Platform 412 may include standards-defined, commercial or proprietary DIDO environments such as Ethereum, Polkadot, Iota, Interplanetary File System (IPFS), etc.

A DIDO TE Node Platform Type 420 includes a combination of components 422 that can be implemented using some combination of hardware and software modules. A DIDO TE Node Platform Type 420 describes the different ways in which a DIDO node can be configured or used within a DIDO TE. Each DIDO TE Node can be associated with a DIDO TE platform 424 and may be configured according to a version 426 or instantiation of the TE, a platform kind 428 implemented by the DIDO TE Node and a role 430 played by the DIDO TE Node. The DIDO TE platform 424 may indicate or correspond to an instantiation of a DIDO TE Node Platform Type 420, and may be identified or classified as a virtual machine, container or other kind of virtualized node. A DIDO TE Node may be operated in a role 430 such as a wallet, full node, light node, archival node, or other node.

A DIDO TE Node Set 440 defines a reusable set of nodes that may be uniquely identified within a TE. A DIDO TE Node Set 440 includes a combination of components 442 that can be implemented using some combination of hardware and software modules. The DIDO TE Node Set 440 may be identified by a Node Set Name 444 and may be associated with a set of nodes that includes a specified number 446 of nodes. The DIDO TE Node Set 440 may indicate one or more constituent types of nodes 448. In some instances, each DIDO TE Node Set 440 defines a set of nodes that are all of the same type.

A DIDO TE Virtual Network 460 defines a collection of DIDO TE Node Sets 440. A DIDO TE Virtual Network 460 includes a combination of components 462 that can be implemented using some combination of hardware and software modules. The DIDO TE Virtual Network 460 may be identified using a Virtual Network name 464 and may include a defined number of nodes 466 in the collection.

FIG. 5 is a flow diagram 500 that illustrates a process for defining a DIDO TE platform. The process may involve the participation of a DIDO TE Administrator and a DIDO TE Manager. The DIDO TE Administrator may be responsible for creating lists of new DIDO TE Platforms. The DIDO TE Administrator need not create and verify the DIDO TE Platforms. In some instances, the DIDO TE Administrator may create and verify certain of the DIDO TE Platforms. The DIDO TE Manager maintains the DIDO TE Node Type list available to the DIDO TE. When a DIDO TE Platform is authenticated and approved, an entry can be made in a DIDO Node TE Platform Definitions datastore 502 maintained by the DIDO TE Administrator. The DIDO Node TE Platform Definitions datastore 502 or a local datastore 522 that is a copy of the datastore 502 may be accessible to the DIDO TE Manager. In one example, the datastore 502, 522 maintains a reference to platform components, including URLs for instance.

The DIDO TE Administrator may identify the need for a DIDO TE Platform or receive a request 504 for a DIDO TE Platform. Metadata 506 describing the requested TE platform may be provided by the Administrator and, through a query made to the DIDO TE Node Platform Definitions datastore 502, the DIDO TE Administrator may determine at block 508 whether a suitable platform exists. In some examples, a suitable or matching DIDO TE Platform exists in the DIDO TE Node Platform Definitions datastore 502 and the process may be terminated. In some examples, a suitable or matching DIDO TE Platform is not already defined, and a request 510 is made to the DIDO TE Manager to create the definition for the platform. The DIDO TE Manager may create or configure the platform and may create an entry in the DIDO Node TE Platform Definitions datastore 502, 522 for the new DIDO TE Platform definition. Upon completion of the task the Manager notifies the Administrator of the status of the request or the request may be timed out.

Figure 6:
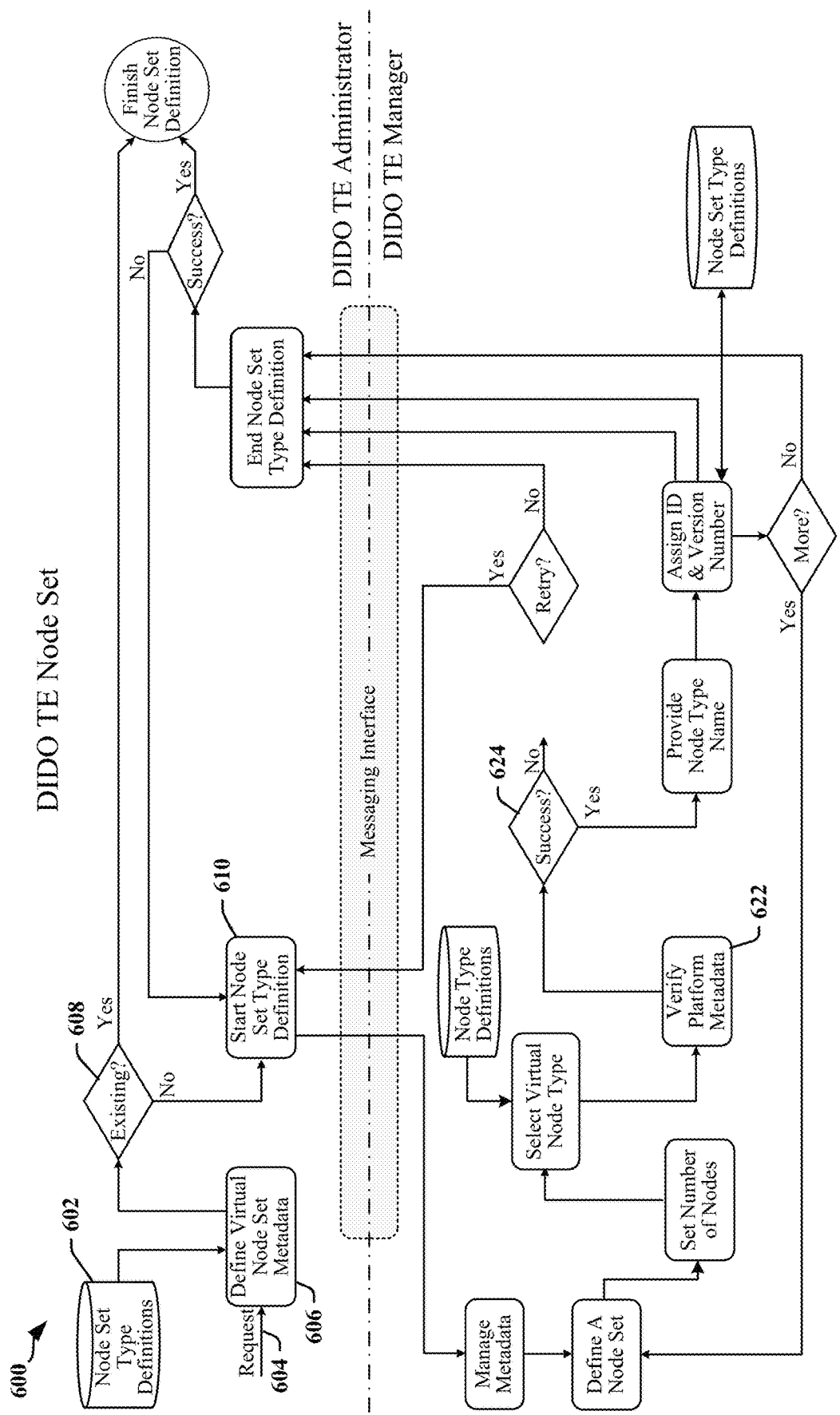
FIG. 6 is a flow diagram that illustrates a process for defining a DIDO TE Node Set in accordance with certain aspects of the disclosure.

FIG. 6 is a flow diagram 600 that illustrates a process for defining a DIDO TE Node Set. The process may involve the participation of a DIDO TE Administrator and a DIDO TE Manager. The DIDO TE Administrator may be responsible for managing and maintaining lists of DIDO TE Node Sets. The DIDO TE Administrator need not create and verify the DIDO TE Node Sets although, in some instances the DIDO TE Administrator may create and verify certain of the DIDO TE Node Sets. The DIDO TE Manager maintains a listing of the DIDO TE Node Sets that are available for use with the DIDO TE. When a DIDO TE Node Set is authenticated and approved an entry may be made to the DIDO TE Platform in the DIDO TE Node Set Type Definitions datastore 602.

The DIDO TE Administrator may identify or receive a request 604 or need for a DIDO TE Node Set Definition. Metadata 606 describing the DIDO TE Node Set may be provided by the Administrator and a query may be made to the DIDO TE Node Set Type Definitions datastore 602 to determine at block 608 whether a suitable or matching Node Set definition already exists. In some examples, a suitable or matching DIDO TE Node Set is already defined and the process may be terminated. If a suitable or matching DIDO TE Node Set is not already defined, a request 610 may be sent to the DIDO TE Manager to create a Node Set Definition and to create an entry in the DIDO Node Set Type Definitions datastore 602 for the new DIDO TE Node Set definition. Upon completion of the task the Manager notifies the Administrator of the status of the request or the request may be timed out. The Administrator is typically informed when a created Node Set Definition cannot be verified at blocks 622 and 624. In one example, a failed verification may result from a request by an Administrator to create an Iota Archival node on an iOS device.

Figure 7:
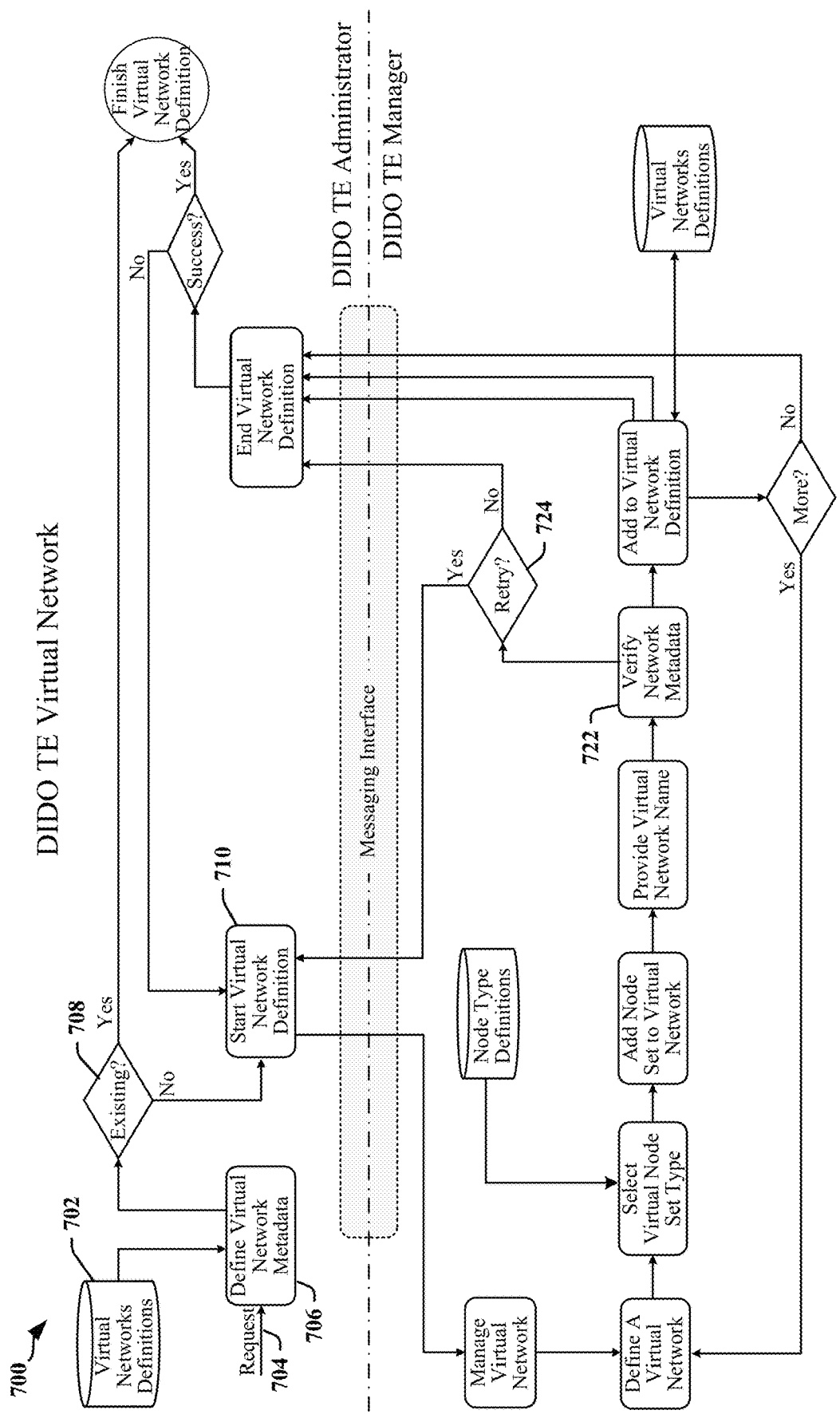
FIG. 7 is a flow diagram that illustrates a process for defining a DIDO TE Virtual Network in accordance with certain aspects of the disclosure.

FIG. 7 is a flow diagram 700 that illustrates a process for defining a DIDO TE Virtual Network. The process may involve the participation of a DIDO TE Administrator and a DIDO TE Manager. The DIDO TE Administrator may be responsible for managing and maintaining lists of DIDO Virtual Networks. The DIDO TE Administrator need not create and verify the DIDO TE Virtual Networks, although the DIDO TE Administrator may be configured to create and verify certain DIDO TE Virtual Networks in some implementations. The DIDO TE Manager may maintain the list of available DIDO TE Virtual Networks for use with the DIDO TE in a DIDO TE Virtual Network Definitions datastore 702. When a DIDO TE Virtual Network is authenticated and approved, an entry can be made in the DIDO TE Virtual Network Definitions datastore 702.

The DIDO TE Administrator may receive or identify a need or request 704 for a DIDO TE Virtual Network Definition. Metadata 706 describing the requested DIDO TE Virtual Node may generated by or provided to the Administrator, and a response to a query made to the DIDO TE Virtual Network Definitions datastore 702 may be used at block 708 to determine whether a suitable Virtual Network definition exists. In some examples, a suitable or matching DIDO TE Virtual Network is already defined and the process may be terminated. If the DIDO TE Virtual Network is not already defined, a request 710 is made to the DIDO TE Manager to create a DIDO TE Virtual Network and to create an entry in the DIDO TE Virtual Network Definitions datastore 702 for the new DIDO TE Virtual Network definition. Upon completion of the task, the Manager notifies the Administrator of the status of the request or the request may be timed out. The Administrator is typically informed when a created Node Set Definition cannot be verified at blocks 722 and 724. In one example, a failed verification may occur after a request by an Administrator to create a Virtual Network using Ethereum with no miners.

Figure 8:
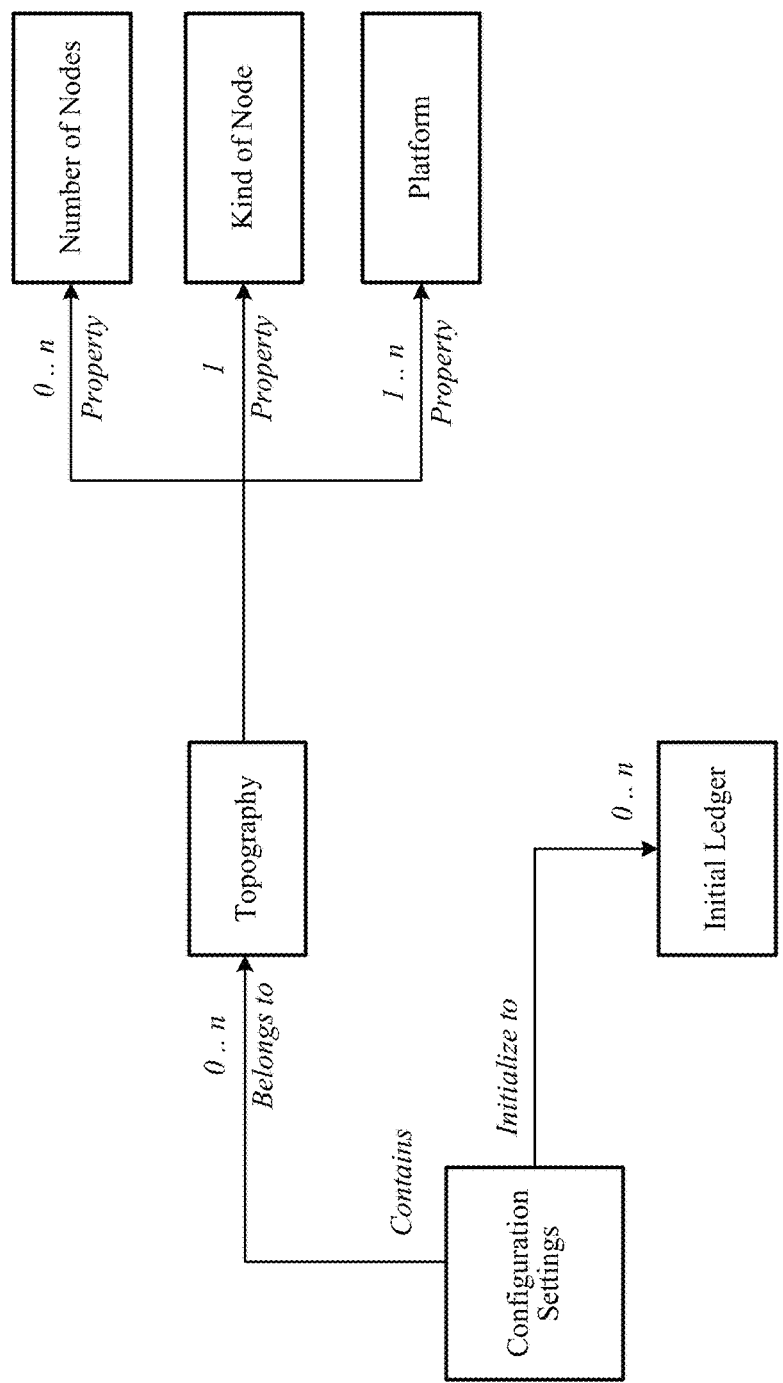
FIG. 8 illustrates certain configuration settings for initializing a DIDO in accordance with certain aspects of the disclosure.

FIG. 8 illustrates certain configuration settings 800 for initializing a DIDO in accordance with certain aspects of the disclosure. The test environment manager 204 is suited for handling a multitude of configuration settings of various types. For example, a testing environment may be configured such that the number of nodes, the kind of nodes, and platform are tracked in the topography. In this scenario, all nodes will be based on a new initial ledger (genesis block for example).

Figure 9:
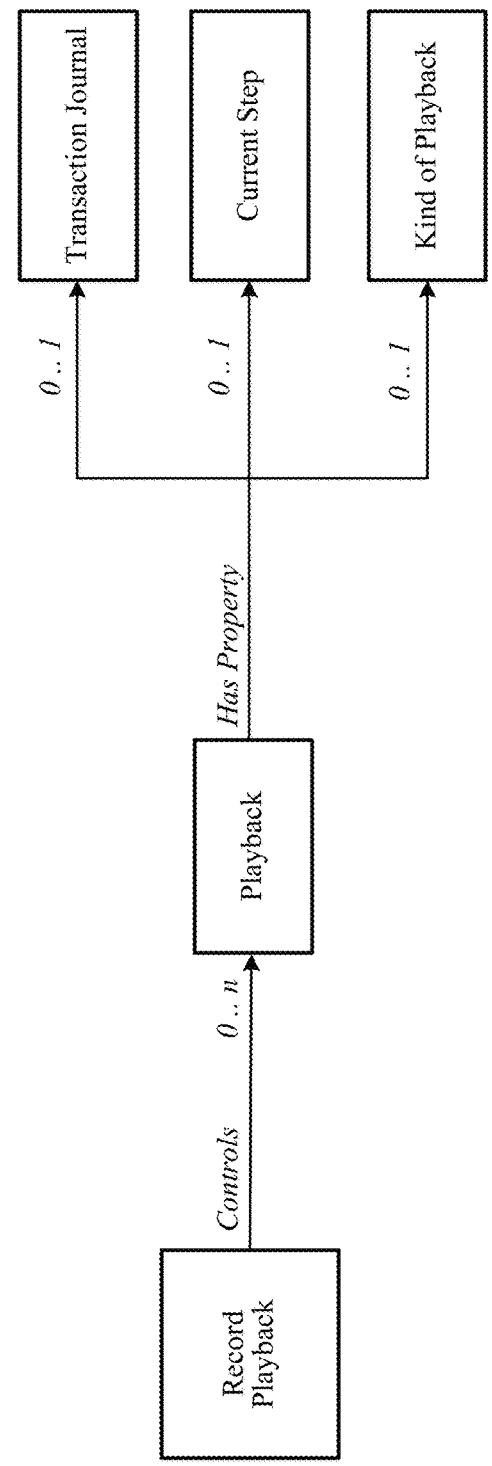
FIG. 9 illustrates an example of code debugging used within the DIDO TE in accordance with certain aspects of the disclosure.
Figure 10:
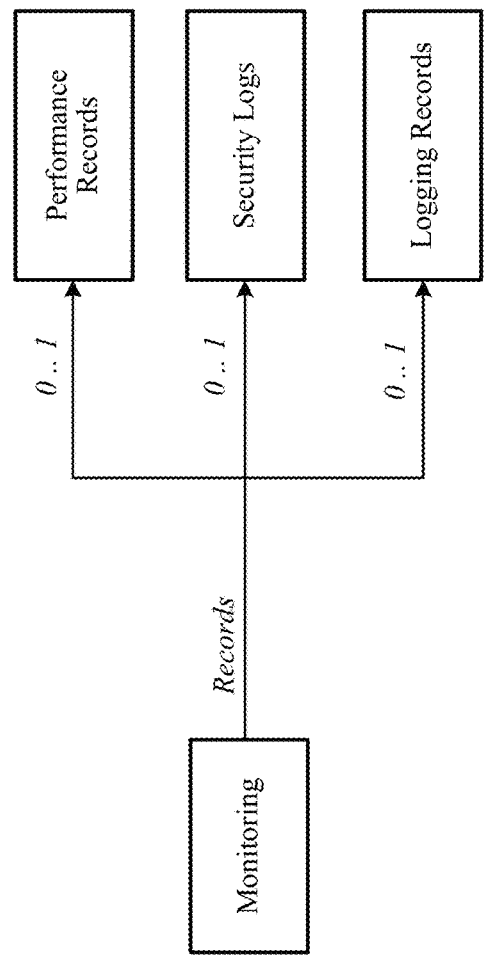
FIG. 10 illustrates an example of DIDO TE Monitors according to certain aspects of the disclosure.
Figure 11:
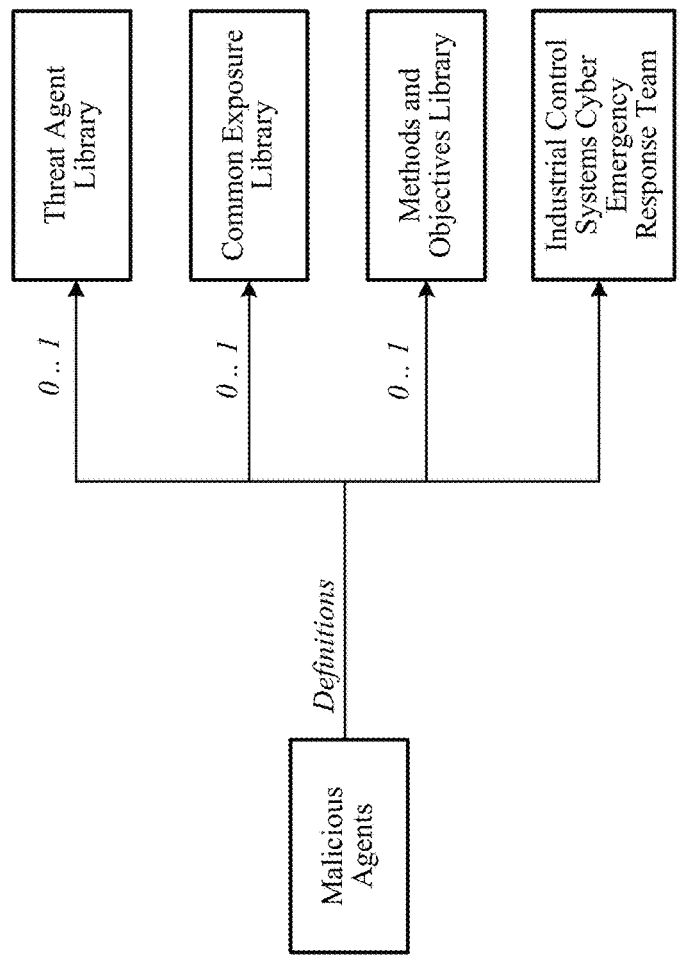
FIG. 11 illustrates an example of a malicious agents test according to certain aspects of the disclosure.
Figure 12:
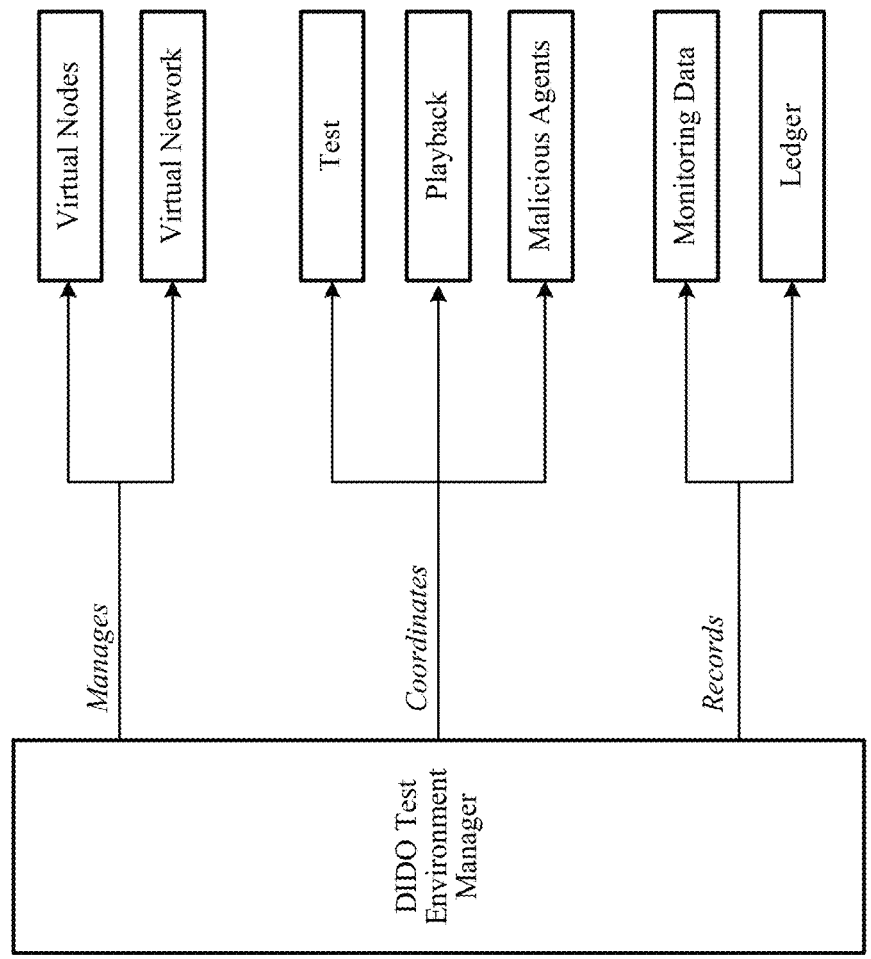
FIG. 12 illustrates an example a DIDO TE manager according to certain aspects of the disclosure.

FIG. 9 illustrates a definitional example of code debugging settings 900 that can configured within the Testing Environment in accordance with certain aspects of the disclosure. FIG. 10 illustrates a definitional example of DIDO TE Monitoring 1000 according to certain aspects of the disclosure. FIG. 11 illustrates a definitional example of a malicious agents test according to certain aspects of the disclosure. FIG. 12 illustrates an example a DIDO TE manager configuration 1200 in accordance with certain aspects of the disclosure.

A DIDO Editor Environment may be configured to manage and control the entire lifecycle of a web-based Integrated Development Environment (IDE). The DIDO Editor Environment may be comparable to the DIDO TE 202 illustrated in FIG. 2 and may include an equivalent of the test environment manager 204. Each IDE is created and managed specifically for each user wanting to edit, deploy, and test Smart Contracts for DIDOs within the DIDO TE scope. This IDE will be customized using multiple plugins to provide enhanced ease-of-use and support unique functionality for each DIDO.

DIDO TE Node Command and Control is a supplemental application for DIDOs that provides an additional vector for commanding or controlling the lifecycle of the DIDO or its environment. In one example, the DIDO TE Node Command and Control application provides an API to manage and configure distributed applications that otherwise do not have an internal API or require additional controls to fully support the user's wants and needs.

In some examples, the testing environment can be hosted on cloud services such as Google Cloud®, Amazon AWS® and Microsoft Azure®. Virtualizing testing environments enables testing for bad or malicious agent without increasing concerns about accidental release of agents into the wild (e.g., into commerce, into public or proprietary cyberspace, etc.).

Figure 13:
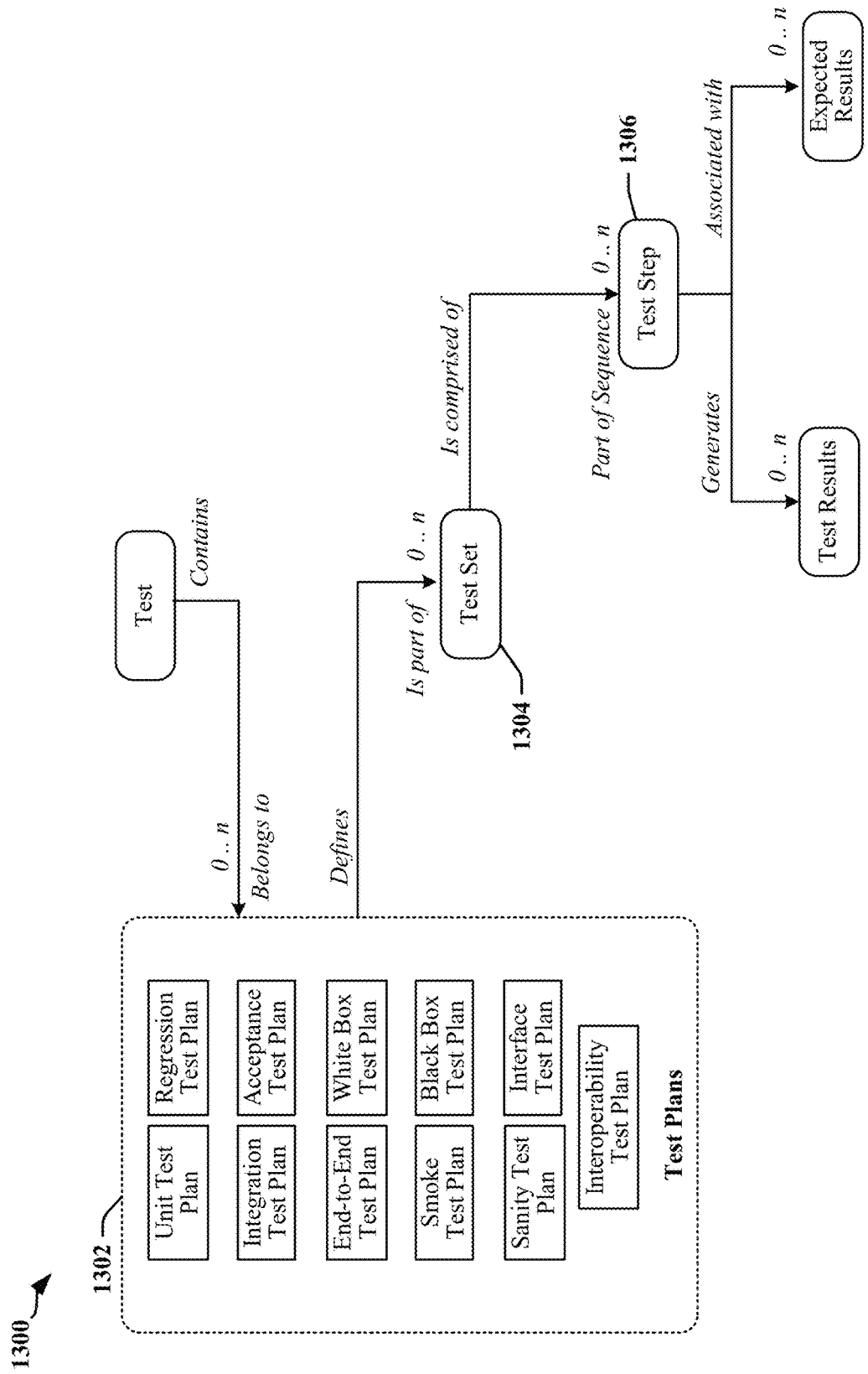
FIG. 13 illustrates an example of the structure of a test and test plan provided in accordance with certain aspects of the disclosure.

FIG. 13 illustrates an example of the structure of a test 1300 and a set of test plans 1302 provided in accordance with certain aspects of the disclosure. The set of test plans 1302 may correspond to the in a set of test plans 230 illustrated in FIG. 2. In various examples, static or dynamic tests contain eleven or more Test Plans including:
- Unit Testing
- Integration Testing
- End-to-End Testing (E2E Testing)
- Smoke Testing
- Sanity Testing
- Regression Testing
- Acceptance Testing
- White Box Testing
- Black Box Testing
- Interface Testing
- Interoperability Testing
- Malicious Actor Testing (see FIG. 11).

Each test plan may define test sets which consists of multiple Test Steps generating Test Results for comparing with Expected Results.

A DIDO TE enables systematic, reproducible tests to be conducted using a DIDO TE Virtual Network of Nodes. A Test Set 1304 can exercise a single DIDO Virtual Node, a subset of Virtual Nodes or all the Virtual Nodes within the Test Network. A Test may be associated with or be controlled using a test definition that uniquely identifies the test plan in the set of test plans 1302 and the Test Set 1304. The Test Set 1304 may include one or more test steps 1306, each test step 1306 defining expected test results for the test step 1306. The test step 1306 is expected to produce test results capturing the outcome of the test step 1306.

Figure 14:
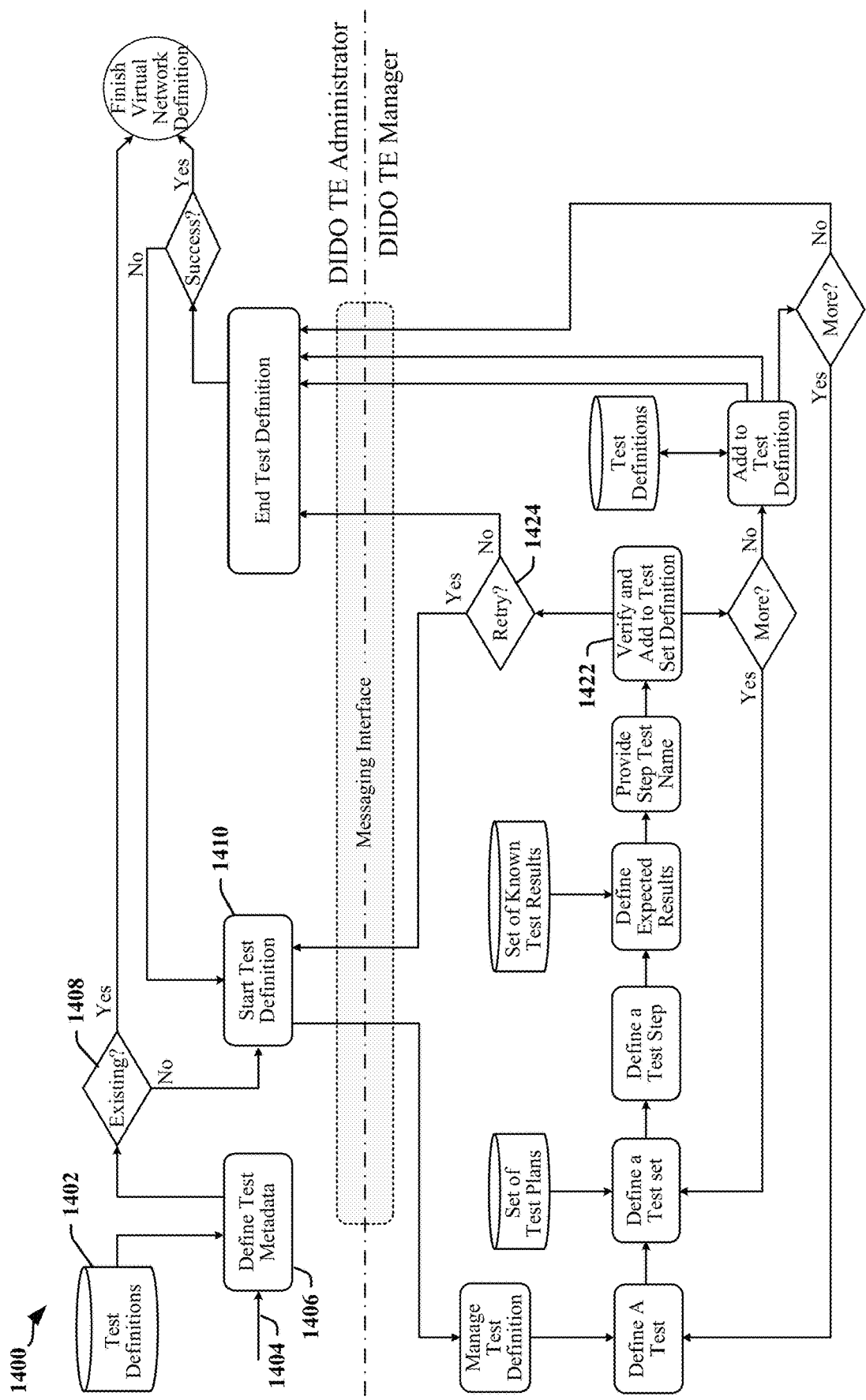
FIG. 14 is a flow diagram that illustrates a process for defining a test performed using a DIDO TE in accordance with certain aspects of the disclosure.

FIG. 14 is a flow diagram 1400 that illustrates a process for defining a test performed using a DIDO TE. The process may involve the participation of a DIDO TE Administrator and a DIDO TE Manager. The DIDO TE Administrator is responsible for managing and maintaining lists of DIDO TE tests. The DIDO TE Administrator need not create and verify the DIDO TE tests. In some instances, the DIDO TE Administrator may be configured to create and verify certain of the DIDO TE tests. The DIDO TE Manager may maintain the list of available DIDO TEs for use with the DIDO TE in a DIDO TE Test Definition datastore 1402. When a DIDO TE test is authenticated and approved an entry is made to the DIDO TE Test Definition datastore 1402.

In one example, the DIDO TE Administrator may receive a request 1404 for a DIDO TE Test Definition or may otherwise identify the need for a DIDO TE Test Definition. Metadata 1406 describing a DIDO TE Test may generated by or provided to the Administrator, and a response to a query made to the DIDO TE Test Definition datastore 1402 may be used at block 1408 to determine whether a suitable Test Definition already defined. If the DIDO TE Test is not already defined, a request 1410 is made to the DIDO TE Manager to create a test and to create an entry in the DIDO Test Datastore for the new test definition. Upon completion of the task the DIDO TE Manager notifies the DIDO TE Administrator of the status of the request or the request may be timed out. The Administrator is typically informed when a created DIDO TE Test Definition cannot be verified at blocks 1422 and 1424. In one example, a failed verification may occur after a request to create a test is provided by an Administrator without providing expected results.

Figure 15:
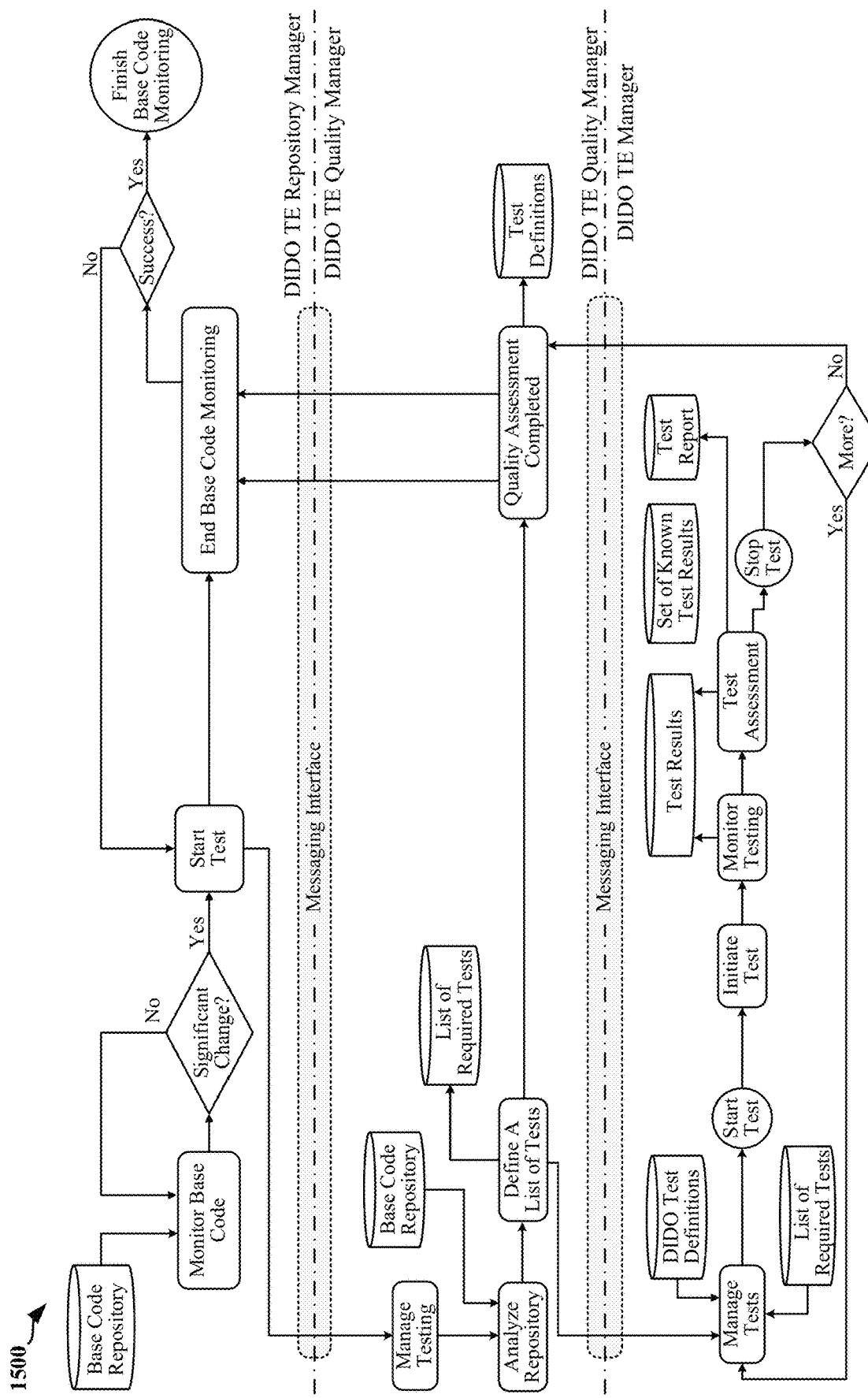
FIG. 15 is a flow diagram that illustrates a process for executing a test using a DIDO TE in accordance with certain aspects of the disclosure.

FIG. 15 is a flow diagram 1500 that illustrates a process for executing a test using a DIDO TE. With continued reference to FIG. 2, the process may involve the participation of a DIDO TE Repository Manager, a DIDO TE Quality Manager and a DIDO TE Manager. The DIDO TE Repository Manager or DIDO TE Administrator need not create or perform the Quality Assessment. The DIDO TE Quality Manager analyzes the Base Code Modifications and defines the list of tests that need to be performed on the new base code in order to assure the quality before it is released. An example of a change to the base code not requiring a quality assessment might be the addition or modification of comments within the code base. The DIDO TE Test Manager is responsible for executing all of the tests that are required in order to assure the quality of the product before it is released. At the end of the testing process a quality assessment report is generated from the individual Test Reports generated for each of the required tests.

In one example, the DIDO TE Repository Manager identifies the need for a quality assessment to be conducted. Metadata describing a test procedure is provided by the DIDO TE Repository Manager to the DIDO TE Quality Manager to start a quality assessment of the repository. The DIDO TE Quality Manager analyzes the Base Code Repository and determines which tests need to be conducted in order to assure the quality of the base code. The DIDO TE Test Manager works through the list of tests and creates a test report that covers each individual test conducted and summarizes the overall results. Upon completion of the task the DIDO TE Test Manager notifies the DIDO TE Quality Manager of the status of the request or the testing request is timed out.

In various examples, multiple kinds of nodes are created in a virtualized network with all the required resources allocated for interoperability testing. The system may be scaled from one to thousands of virtualized nodes on a virtualized network. In some instances, a test platform can be configured and operable in time frames measurable in seconds or fractions of seconds. The testing environment may be virtualized to permit for bad or malicious agent testing without concern for accidental release of agents. Container orchestration may be used to enable comprehensive static and dynamic testing of distributed systems using container orchestration.

Figure 16:
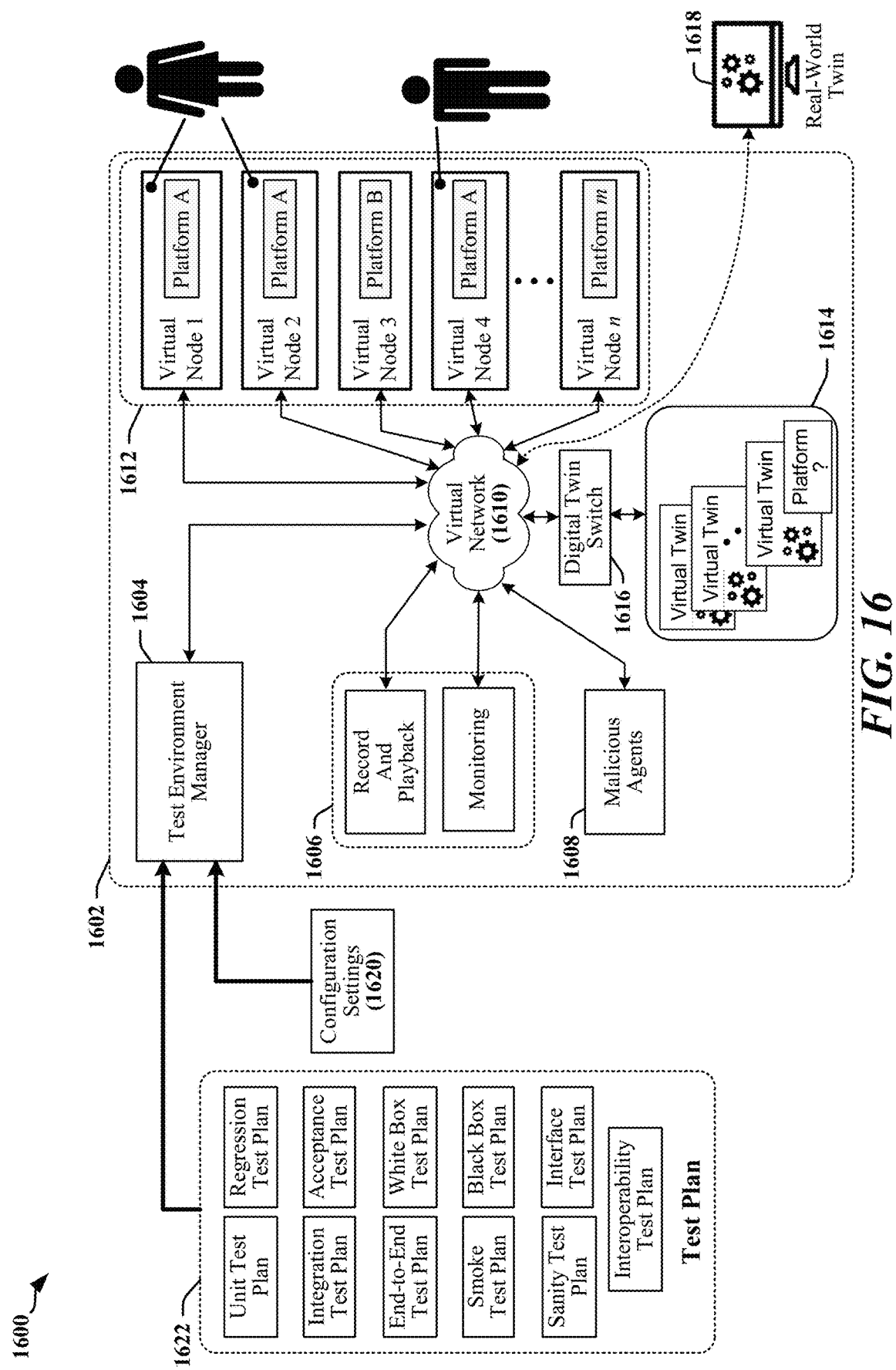
FIG. 16 illustrates a second example of a distributed TE configured in accordance with certain aspects of the disclosure.

FIG. 16 shows an example of a DIDO TE framework 1600. The DIDO TE 1602 provides a framework that can operate within any environment containing a specialized aggregation of DIDO Solution specific concepts and interfaces easing control and management of a distributed network of nodes in a DIDO. The DIDO TE framework 1600 can orchestrate on-demand work through a series of distributed workflow processes 1610 that can, for example, use a mailbox messaging paradigm or interface to communicate status or control requests. Throughout the stages of a defined workflow, processes are spawned, messages are acted upon, responses are received, and resources are freed after the work is completed. Since these processes are distributed in a manner similar to any distributed application, the framework can even host itself allowing the system to grow in an infinite manner.

In one example, the DIDO TE 1602 is built upon a functional programming language such as the Elixir functional programming language that may be configured for use with an Erlang virtual machine. The illustrated DIDO TE 1602 includes a test environment manager 1604 that can execute applications that govern the messaging layer through custom Application Programming Interfaces (APIs). In some examples, interaction with these APIs can be effected through a public REST interface or via a simple and easy to use graphical user interface (GUI). The term "REST interface" may refer to a distributed system framework that uses Web protocols and technologies. A REST architecture may relate to client and server interactions. Applications may be packaged and made distributable for any host operating system, thereby allowing for portability and the use of isolated operating environments.

In some examples, a secure HTTP(S) web server (DIDO Web) may be used to host a user-friendly web GUI to interact and configure the DIDO TE 1602 testing environment. This application also hosts the REST interface for client and third-party application access. These two servers can be tightly coupled for use-case flexibility and feature implementation ease. Third-party authentication provides the application with multiple integration possibilities for additional future plugin features.

Each node within the system can be a physical node or a virtual node. Every node within the system can be identified through an assigned unique identifier (Node ID). According to certain aspects, multiple nodes can be defined with the same Node ID and a pair of nodes that share a common Node ID may be referred to as twins. Twins cannot be concurrently active in an active system. That is, only one instance of a node with a twins' address can be active and addressed at any particular time in an active or operational system. In some implementations, a switching circuit or component can be configured to route traffic to a twin selected from a physical instantiation (real-world twin 1618) or virtual instances of a node (e.g., nodes in a virtual twin pool 1614). The switch may be operated to permit multiple instances of nodes with the same Node ID to exist within an active or operating system. Virtual nodes with the same Node ID can exist as part of a virtual twin pool 1614. A virtual twin switch 1616 can be configured to select between instances within the virtual twin pool 1614 to use during runtime. In addition to the virtual twin pool 1614, an instance of a physical node 1612 can exist and operate as a twin. The virtual twin switch 1616 can be configured to allow the physical node 1612 to be used instead of any of the virtual nodes within the virtual twin pool 1614. Upon initialization, a controller or the virtual twin switch 1616 can determine whether the physical node 1612 or a virtual twin in the virtual twin pool 1614 is to be used. Physical nodes 1612 may require additional configuration parameters to bridge the gap between the virtual and physical worlds.

Figure 17:
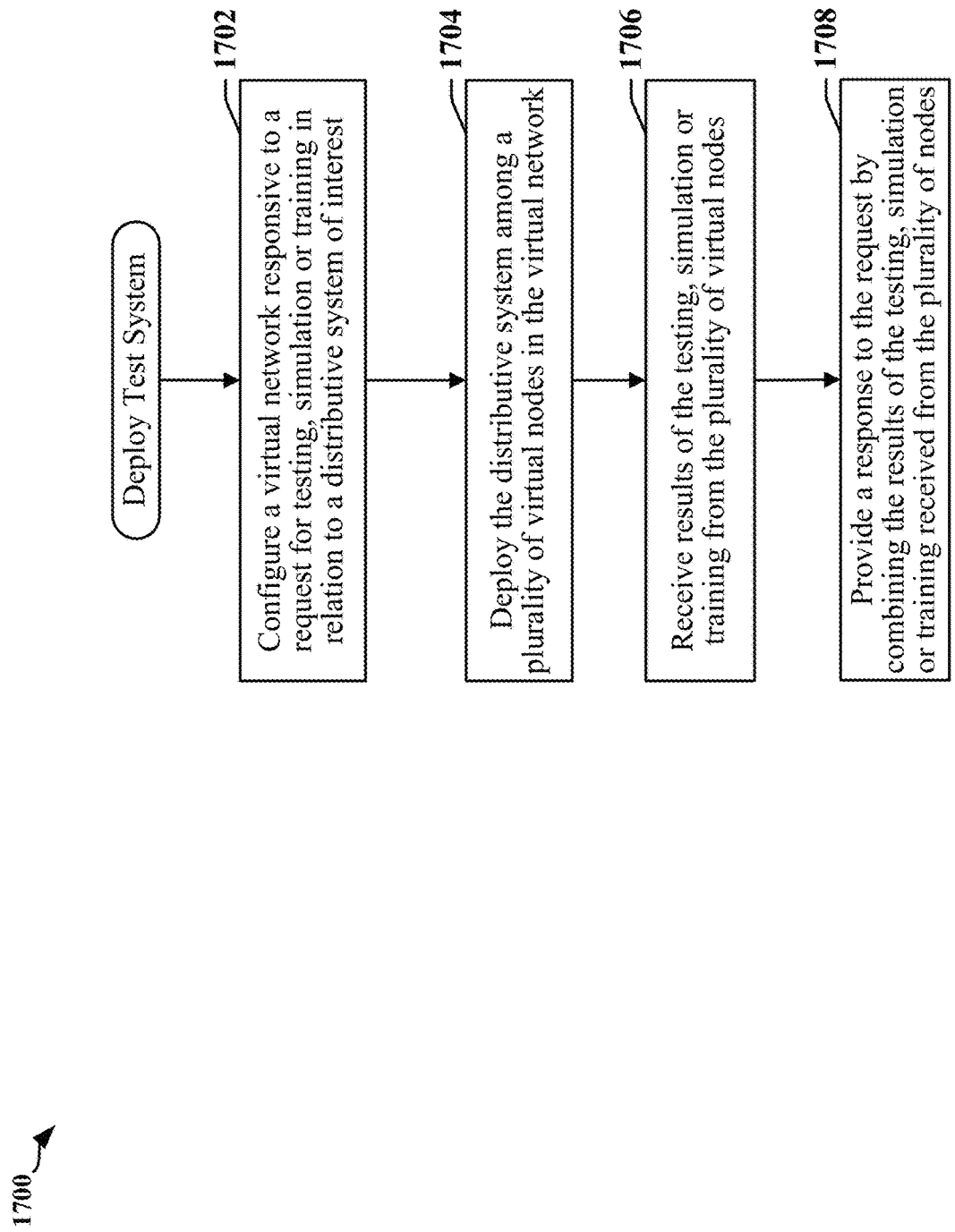
FIG. 17 is a flowchart that illustrates configuring a test platform according to certain aspects of the disclosure.

FIG. 17 is a flowchart 1700 illustrating a method for configuring a test platform that may include the test environment manager 204 illustrated in the DIDO TE framework 200 of FIG. 2 or the test environment manager 1604 illustrated in the DIDO TE framework 1600 of FIG. 16. At block 1702, the test environment manager 204 or 1604 may configure a virtual network of virtual nodes responsive to a request for testing, simulation or training in relation to a distributive system of interest. At block 1704, the test environment manager 204 or 1604 may deploy the distributive system among a plurality of virtual nodes in the virtual network. At block 1706, the test environment manager 204 or 1604 may receive results of the testing, simulation or training from the plurality of virtual nodes. At block 1708, the test environment manager 204 or 1604 may provide a response to the request by combining the results of the testing, simulation or training received from the plurality of nodes.

In some examples, the test environment manager 204 or 1604 may configure each of a plurality of physical nodes to implement virtual node of the plurality of virtual nodes. The plurality of physical nodes may include physical nodes that are situated in geographically remote locations with respect to one another. In some instances, the virtual network cooperates with at least one physical node. For example, the testing, simulation or training may be performed using a real-world device, node or system that interacts with the virtual network. In the latter example, the real-world device, node or system may include a cryptographic server or a device, node or system under test.

In one example, at least one node of the virtual network comprises a container. In one example, at least one node of the virtual network comprises a virtual machine.

In one example, the test environment manager 204 or 1604 may configure the plan with a set of test procedures when the request relates to testing, allocate portions of the test procedures among the nodes of the virtual network, receive results of the test procedures, and provide test results by combining results of the test procedures received from the plurality of nodes.

In various examples, the test environment manager 204 or 1604 may configure a test plan 230, 1622 to cause at least one virtual node to modify a DIDO and provide a modified DIDO in the results of the test. The DIDO may include a distributed ledger configured to securely maintain one or more transaction records.

In various examples, the test environment manager 204 or 1604 may configure a timeline for executing the test plan 230, 1622 on the virtual network of virtual nodes. The timeline may be executed consistent with real time. The timeline may be executed at a rate greater than real time. The timeline may be executed at a rate that is less than real time. The test environment manager 204 or 1604 may repeat execution of the test, simulation or training base. The timeline for executing the test plan 230, 1622 on the virtual network of virtual nodes is restarted for each execution of the test, simulation or training. The test environment manager 204 or 1604 may configure the test plan 230, 1622 to cause at least one virtual node to modify a distributed ledger of a DIDO. Modifying the distributed ledger may include using time-sensitive cryptography to encrypt information maintained by the distributed ledger. The timeline may be configured to influence the time-sensitive cryptography.

In one example, the test environment manager 204 or 1604 may generate baseline results for the test plan 230, 1622 by executing the test, simulation or training when each virtual node in the virtual network comprises a validated node, comparing the baseline results with additional results obtained by executing the test, simulation or training after adding or modifying at least one virtual node in the virtual network, and validating an added or modified virtual node or the virtual network based on the comparison of the baseline results with the additional results.

Figure 18:
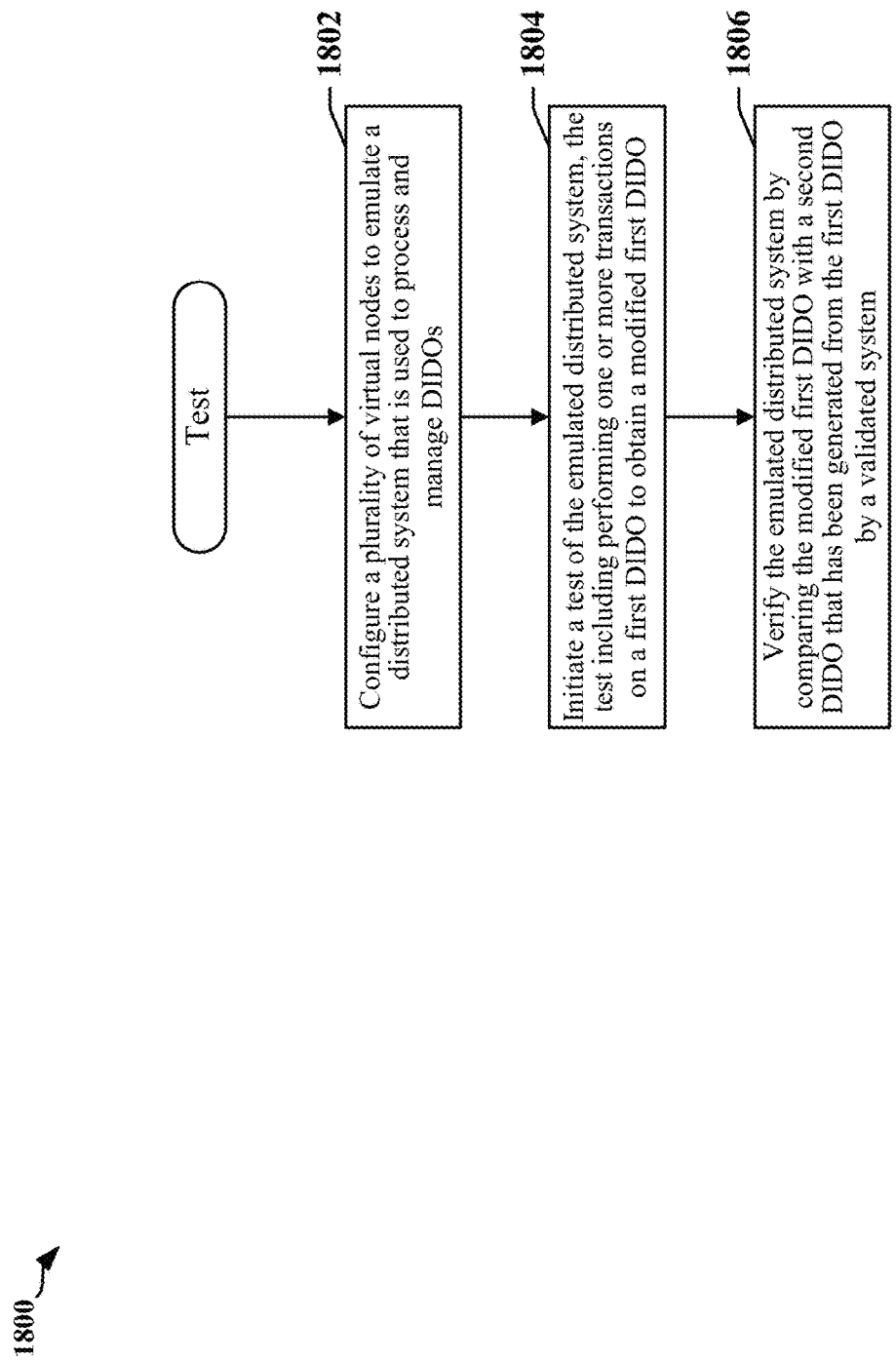
FIG. 18 is a flowchart that illustrates the use of a test platform according to certain aspects of the disclosure.

FIG. 18 is a flowchart 1800 illustrating a method for testing nodes in a distributed system. The distributed system may include the test environment manager 204 illustrated in the DIDO TE framework 200 of FIG. 2 or the DIDO Test Manager 1604 illustrated in the DIDO TE framework 1600 of FIG. 16. At block 1802, the test environment manager 204 or 1604 may configure a plurality of virtual nodes to emulate a distributed system that is used to process and manage DIDOs. At block 1804, the test environment manager 204 or 1604 may initiate a test of the emulated distributed system, the test including performing one or more transactions on a first DIDO to obtain a modified first DIDO. At block 1806, the test environment manager 204 or 1604 may verify the emulated distributed system by comparing the modified first DIDO with a second DIDO that has been generated from the first DIDO by a validated system. In some examples, at least one of the transactions is executed by a node that is under test in the emulated distributed system. The node that is under test may be validated when content of the modified first DIDO corresponds to content of the second DIDO.

In certain examples, the first DIDO is a copy of a reference DIDO. The second DIDO may be obtained by causing the validated system to perform the one or more transactions on an identical copy of the first DIDO. The reference DIDO may include or be associated with a first distributed ledger configured to securely maintain one or more transaction records. The second DIDO may include a second distributed ledger. The modified first DIDO includes a third distributed ledger. Each of these distributed ledgers maty be maintained independently. The content of the modified first DIDO may be considered to correspond to content of the second DIDO when decrypted information in the second distributed ledger matches corresponding decrypted information in the third distributed ledger DIDO. The validated system may be a real-world system. The reference DIDO, the second DIDO and the one or more transactions may be copied from the real-world system at corresponding recorded points-in-time.

In some implementations, the test environment manager 204 or 1604 may configure a starting point for a test timeline for executing a test plan 230, 1622 using the emulated distributed system. The one or more transactions are defined by the test plan 230, 1622. In a first mode of operation, the test timeline is executed at a rate consistent with real time. In a second mode of operation, the test timeline is executed at a rate different from real time. The test environment manager 204 or 1604 may restart the test with an unmodified version of the first DIDO after resetting the test timeline to the starting point. The test environment manager 204 or 1604 may configure the test plan 230, 1622 to cause at least one virtual node to modify a distributed ledger of the first DIDO. Modifying the distributed ledger may include using time-sensitive cryptography to encrypt information maintained by the distributed ledger in accordance with the test timeline.

In some examples, the test environment manager 204 or 1604 may configure a plurality of physical nodes to implement different virtual nodes in the plurality of virtual nodes. The plurality of physical nodes can include physical nodes that are situated in geographically remote locations with respect to one another. In one example, at least one node of the plurality of virtual nodes comprises a container.

In certain implementations, the test environment manager 204 or 1604 may be configured to generate baseline results for the test plan 230, 1622 by executing the test when each virtual node in the emulated distributed system comprises a validated node, compare the baseline results with additional results obtained by executing the test after adding or modifying at least one virtual node in the emulated distributed system, and validate an added or modified virtual node or the emulated distributed system when the baseline results match the additional results. A virtual twin node may be included in the emulated distributed system, where the virtual twin node is addressed using an identifier shared by one or more other twin nodes in the emulated distributed system. The test environment manager 204 or 1604 may compare the baseline results with additional results obtained by executing the test after adding or modifying the virtual twin node, and may validate at least one added or modified virtual twin node or the emulated distributed system when the baseline results match the additional results. The test environment manager 204 or 1604 may compare the baseline results with additional results obtained by executing the test after adding or modifying a physical twin node in the one or more other twin nodes, and validate the added or modified physical twin node or the emulated distributed system when the baseline results match the additional results.

A test platform or test environment implemented using a distributed system may have a plurality of processing systems each configured to operate one or more of a plurality of virtual nodes, a network coupled to the plurality of processing systems and configured to communicatively couple the plurality of virtual nodes such that the plurality of virtual nodes is configured to emulate a distributed system that is used to process and manage DIDOs, and a test management processor. The test management processor may be configured to initiate a test of the emulated distributed system, the test including performing one or more transactions on a first DIDO to obtain a modified first DIDO. The test management processor may be further configured to verify the emulated distributed system by comparing the modified first DIDO with a second DIDO that has been generated from the first DIDO by a validated system.

In some examples, at least one of the one or more transactions is executed by a virtual node under test in the emulated distributed system. The test management processor may be further configured to validate the virtual node under test when content of the modified first DIDO corresponds to content of the second DIDO.

The first DIDO may be a copy of a reference DIDO, and/or the second DIDO is obtained by causing the validated system to perform the one or more transactions on an identical copy of the first DIDO. The validated system may include a real-world system. The reference DIDO, the second DIDO and the one or more transactions may be copied from the real-world system at corresponding recorded points-in-time.

In some implementations, the test management processor is further configured to generate baseline results for the test plan 230, 1622 by executing the test when each virtual node in the emulated distributed system comprises a validated node, include a twin node in the emulated distributed system, compare the baseline results with additional results obtained by executing the test after adding or modifying the virtual twin node and validate at least one added or modified twin node or the emulated distributed system when the baseline results match the additional results. The twin node may be addressed using an identifier shared by one or more other twin nodes in the emulated distributed system.

Some implementation examples are described in the following numbered clauses:

1. A method for testing nodes in a distributed system comprising: configuring a plurality of virtual nodes to emulate a distributed system that is used to process and manage distributed immutable data objects (DIDOs); initiating a test of the emulated distributed system, the test including performing one or more transactions on a first DIDO to obtain a modified first DIDO; and verifying the emulated distributed system by comparing the modified first DIDO with a second DIDO that has been generated from the first DIDO by a validated system.
2. The method as described in clause 1, wherein at least one of the one or more transactions is executed by a node under test in the emulated distributed system.
3. The method as described in clause 1 or clause 2, further comprising: validating the node under test when content of the modified first DIDO corresponds to content of the second DIDO.
4. The method as described in any of clauses 1-3, wherein the first DIDO is a copy of a reference DIDO and wherein the second DIDO is obtained by causing the validated system to perform the one or more transactions on an identical copy of the first DIDO.

5. The method as described in clause 4, wherein the reference DIDO includes a first distributed ledger configured to securely maintain one or more transaction records and wherein the second DIDO includes a second distributed ledger and the modified first DIDO includes a third distributed ledger, each distributed ledger being maintained independently.

6. The method as described in clause 5, wherein the content of the modified first DIDO corresponds to content of the second DIDO when decrypted information in the second distributed ledger matches corresponding decrypted information in the third distributed ledger DIDO.

7. The method as described in any of clauses 4-6, wherein the validated system is a real-world system, and wherein the reference DIDO, the second DIDO and the one or more transactions are copied from the real-world system at corresponding recorded points-in-time.

8. The method as described in any of clauses 1-7, further comprising: configuring a starting point for a test timeline for executing a test plan using the emulated distributed system, wherein the one or more transactions are defined by the test plan.

9. The method as described in clause 8, wherein the test timeline is executed at a rate consistent with real time in a first mode of operation and at a rate different from real time in a second mode of operation.

10. The method as described in clause 8 or clause 9, further comprising: restarting the test with an unmodified version of the first DIDO after resetting the test timeline to the starting point.

11. The method as described in any of clauses 8-10, further comprising: configuring the test plan to cause at least one virtual node to modify a distributed ledger of the first DIDO, wherein modifying the distributed ledger includes using time-sensitive cryptography to encrypt information maintained by the distributed ledger in accordance with the test timeline.

12. The method as described in any of clauses 1-11, further comprising: configuring a plurality of physical nodes to implement different virtual nodes in the plurality of virtual nodes, wherein the plurality of physical nodes includes physical nodes that are situated in geographically remote locations with respect to one another.

13. The method as described in any of clauses 1-12, wherein at least one node of the plurality of virtual nodes comprises a container.

14. The method as described in any of clauses 1-13, further comprising: generating baseline results for the test by executing the test when each virtual node in the emulated distributed system comprises a validated node; and comparing the baseline results with additional results obtained by executing the test after adding or modifying at least one virtual node in the emulated distributed system; and validating an added or modified virtual node or the emulated distributed system when the baseline results match the additional results.

15. The method as described in clause 14, further comprising: including a virtual twin node in the emulated distributed system, wherein the virtual twin node is addressed using an identifier shared by one or more other twin nodes in the emulated distributed system; comparing the baseline results with additional results obtained by executing the test after adding or modifying the virtual twin node; and validating at least one added or modified virtual twin node or the emulated distributed system when the baseline results match the additional results.

16. The method as described in clause 14 or clause 15, further comprising: comparing the baseline results with additional results obtained by executing the test after adding or modifying a physical twin node in the one or more other twin nodes; and validating the added or modified physical twin node or the emulated distributed system when the baseline results match the additional results.

17. A test platform for a distributed system comprising: a plurality of processing systems each configured to operate one or more of a plurality of virtual nodes; a network coupled to the plurality of processing systems and configured to communicatively couple the plurality of virtual nodes such that the plurality of virtual nodes is configured to emulate a distributed system that is used to process and manage distributed immutable data objects (DIDOs); and a test management processor configured to: initiate a test of the emulated distributed system, the test including performing one or more transactions on a first DIDO to obtain a modified first DIDO; and verify the emulated distributed system by comparing the modified first DIDO with a second DIDO that has been generated from the first DIDO by a validated system.

18. The test platform as described in clause 17, wherein at least one of the one or more transactions is executed by a virtual node under test in the emulated distributed system, and wherein the test management processor is further configured to: validate the virtual node under test when content of the modified first DIDO corresponds to content of the second DIDO.

19. The test platform as described in clause 17 or clause 18, wherein the first DIDO is a copy of a reference DIDO, wherein the second DIDO is obtained by causing the validated system to perform the one or more transactions on an identical copy of the first DIDO, wherein the validated system is a real-world system, and wherein the reference DIDO, the second DIDO and the one or more transactions are copied from the real-world system at corresponding recorded points-in-time.

20. The test platform as described in any of clauses 17-19, wherein the test management processor is further configured to: generate baseline results for the test plan by executing the test when each virtual node in the emulated distributed system comprises a validated node; include a twin node in the emulated distributed system, wherein the twin node is addressed using an identifier shared by one or more other twin nodes in the emulated distributed system; compare the baseline results with additional results obtained by executing the test after adding or modifying the virtual twin node; and validate at least one added or modified twin node or the emulated distributed system when the baseline results match the additional results.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method for testing nodes in a distributed system comprising:
    configuring a plurality of virtual nodes to emulate a distributed system that is used to process and manage distributed immutable data objects (DIDOs) in the distributed system;
    initiating, by a test environment, a test of the emulated distributed system, the test including performing one or more transactions on a first DIDO to obtain a modified first DIDO in the emulated distributed system;
    verifying, by the test environment, the emulated distributed system by comparing the modified first DIDO with a second DIDO that has been generated from the first DIDO by a validated system;
    generating, by the test environment, baseline results for the test by executing the test when each virtual node in the emulated distributed system comprises a validated node;
    comparing, by the test environment, the baseline results with additional results obtained by executing the test after adding or modifying at least one virtual node in the emulated distributed system; and
    validating, by the test environment, the added or modified at least one virtual node or the emulated distributed system when the baseline results match the additional results.

2. The method of claim 1, wherein at least one of the one or more transactions is executed by a node under test in the emulated distributed system.

3. The method of claim 2, further comprising:
    validating the node under test when content of the modified first DIDO corresponds to content of the second DIDO.

4. The method of claim 1, wherein the first DIDO is a copy of a reference DIDO and wherein the second DIDO is obtained by causing the validated system to perform the one or more transactions on an identical copy of the first DIDO.

5. The method of claim 4, wherein the reference DIDO includes a first distributed ledger configured to securely maintain one or more transaction records and wherein the second DIDO includes a second distributed ledger and the modified first DIDO includes a third distributed ledger, each distributed ledger being maintained independently.

6. The method of claim 5, wherein content of the modified first DIDO corresponds to content of the second DIDO when decrypted information in the second distributed ledger matches corresponding decrypted information in the third distributed ledger.

7. The method of claim 4, wherein the validated system is a real-world system, and wherein the reference DIDO, the second DIDO and the one or more transactions are copied from the real-world system at corresponding recorded points-in-time.

8. The method of claim 1, further comprising:
    configuring a starting point for a test timeline for executing a test plan using the emulated distributed system, wherein the one or more transactions are defined by the test plan.

9. The method of claim 8, wherein the test timeline is executed at a rate consistent with real time in a first mode of operation and at a rate different from real time in a second mode of operation.

10. The method of claim 8, further comprising:
    restarting the test with an unmodified version of the first DIDO after resetting the test timeline to the starting point.

11. The method of claim 8, further comprising:
    configuring the test plan to cause at least one virtual node to modify a distributed ledger of the first DIDO, wherein modifying the distributed ledger includes using time-sensitive cryptography to encrypt information maintained by the distributed ledger in accordance with the test timeline.

12. The method of claim 1, further comprising:
    configuring a plurality of physical nodes to implement different virtual nodes in the plurality of virtual nodes, wherein the plurality of physical nodes includes physical nodes that are situated in geographically remote locations with respect to one another.

13. The method of claim 1, wherein at least one node of the plurality of virtual nodes comprises a container.

14. The method of claim 1, further comprising:
    including a virtual twin node in the emulated distributed system, wherein the virtual twin node is addressed using an identifier shared by one or more other twin nodes in the emulated distributed system; comparing the baseline results with the additional results obtained by executing the test after adding or modifying the virtual twin node; and
    validating the added or modified virtual twin node or the emulated distributed system when the baseline results match the additional results obtained by executing the test after adding or modifying the virtual twin node.

15. The method claim 1, further comprising:
    including a physical twin node in the emulated distributed system, wherein the physical twin node is addressed using an identifier shared by one or more other twin nodes in the emulated distributed system; comparing the baseline results with the additional results obtained by executing the test after adding or modifying the physical twin node; and validating the added or modified physical twin node or the emulated distributed system when the baseline results match the additional results obtained by executing the test after adding or modifying the physical twin node.

* * * * *